US012607601B2

(12) United States Patent
Sheng et al.

(10) Patent No.: US 12,607,601 B2
(45) Date of Patent: Apr. 21, 2026

(54) PROCESSING OF AZIMUTHAL ELECTROMAGNETIC PIPE INSPECTION DATA

(71) Applicant: Halliburton Energy Services, Inc., Houston, TX (US)

(72) Inventors: Huiwen Sheng, Singapore (SG); Ahmed Fouda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 152 days.

(21) Appl. No.: 18/525,396

(22) Filed: Nov. 30, 2023

(65) Prior Publication Data

US 2025/0180515 A1     Jun. 5, 2025

(51) Int. Cl.
| | |
|---|---|
| *G01N 27/90* | (2021.01) |
| *E21B 47/002* | (2012.01) |
| *G01V 3/30* | (2006.01) |

(52) U.S. Cl.
CPC ........... *G01N 27/90* (2013.01); *E21B 47/002* (2020.05); *G01V 3/30* (2013.01)

(58) Field of Classification Search
CPC ......... G01N 27/90; E21B 47/002; G01V 3/30
See application file for complete search history.

(56) References Cited

U.S. PATENT DOCUMENTS

| | | | |
|---|---|---|---|
| 7,960,969 B2 | 6/2011 | Mouget et al. | |
| 9,715,034 B2 | 7/2017 | Omeragic et al. | |
| 10,641,594 B2 | 5/2020 | San martin et al. | |
| 2007/0024285 A1 | 2/2007 | Wang et al. | |
| 2009/0254281 A1 | 10/2009 | Hruska et al. | |
| 2015/0381981 A1 | 12/2015 | Gelman et al. | |
| 2018/0074220 A1* | 3/2018 | David | G01V 3/26 |
| 2018/0100950 A1 | 4/2018 | Yao et al. | |
| 2020/0081148 A1* | 3/2020 | Capoglu | E21B 47/00 |

(Continued)

OTHER PUBLICATIONS

International Search Report and Written Opinion for International Patent Application No. PCT/US2023/084862 dated Aug. 23, 2024. PDF file. 7 pages.

(Continued)

*Primary Examiner* — Eman A Alkafawi
*Assistant Examiner* — Suresh K Rajaputra
(74) *Attorney, Agent, or Firm* — John Wustenberg; C. Tumey Law Group PLLC

(57)     ABSTRACT

A method and system comprising disposing an electromagnetic (EM) logging tool in a wellbore, wherein the EM logging tool comprises: one or more transmitters disposed on the EM logging tool; and one or more receivers disposed on the EM logging tool. They system and method may further comprise an information handling system configured for transmitting an electromagnetic field from the transmitter into one or more tubulars to energize the one or more tubulars with the electromagnetic field thereby producing an eddy current that emanates from the one or more tubulars; measuring the eddy current in the one or more tubulars with the receiver on at least one channel to obtain a plurality of measurements. Finally, forming an EM log from the plurality of measurements; extracting an eccentricity pattern from the EM log, and inspecting at least the eccentricity pattern and EM log to identify defects in tubulars.

20 Claims, 15 Drawing Sheets

(56) References Cited

U.S. PATENT DOCUMENTS

| | | | | |
|---|---|---|---|---|
| 2020/0182830 A1* | 6/2020 | Fouda | .................... | G01N 17/02 |
| 2020/0309986 A1* | 10/2020 | Donderici | ................ | G01V 3/28 |
| 2022/0065094 A1* | 3/2022 | Hill, III | ................. | E21B 47/13 |

OTHER PUBLICATIONS

Schlumberger, Technology Application, EM Pipe Scanner, Jan. 2010.
Gowell, Magnetic Thickness Detector (MTD), Apr. 2021.
Arbuzov, et al., TGT, Multi String Imaging EmPulse, Jun. 2016.
PCT Application No. PCT/US2017/018946 filed Feb. 22, 2017.
U.S. Appl. No. 18/232,608, filed Aug. 10, 2023.

* cited by examiner

LOGGING POSITION Z1

LOGGING POSITION Z2

LOGGING POSITION Z3

LOGGING POSITION Z4

LOGGING POSITION Z5

400

404

402

136

134

138

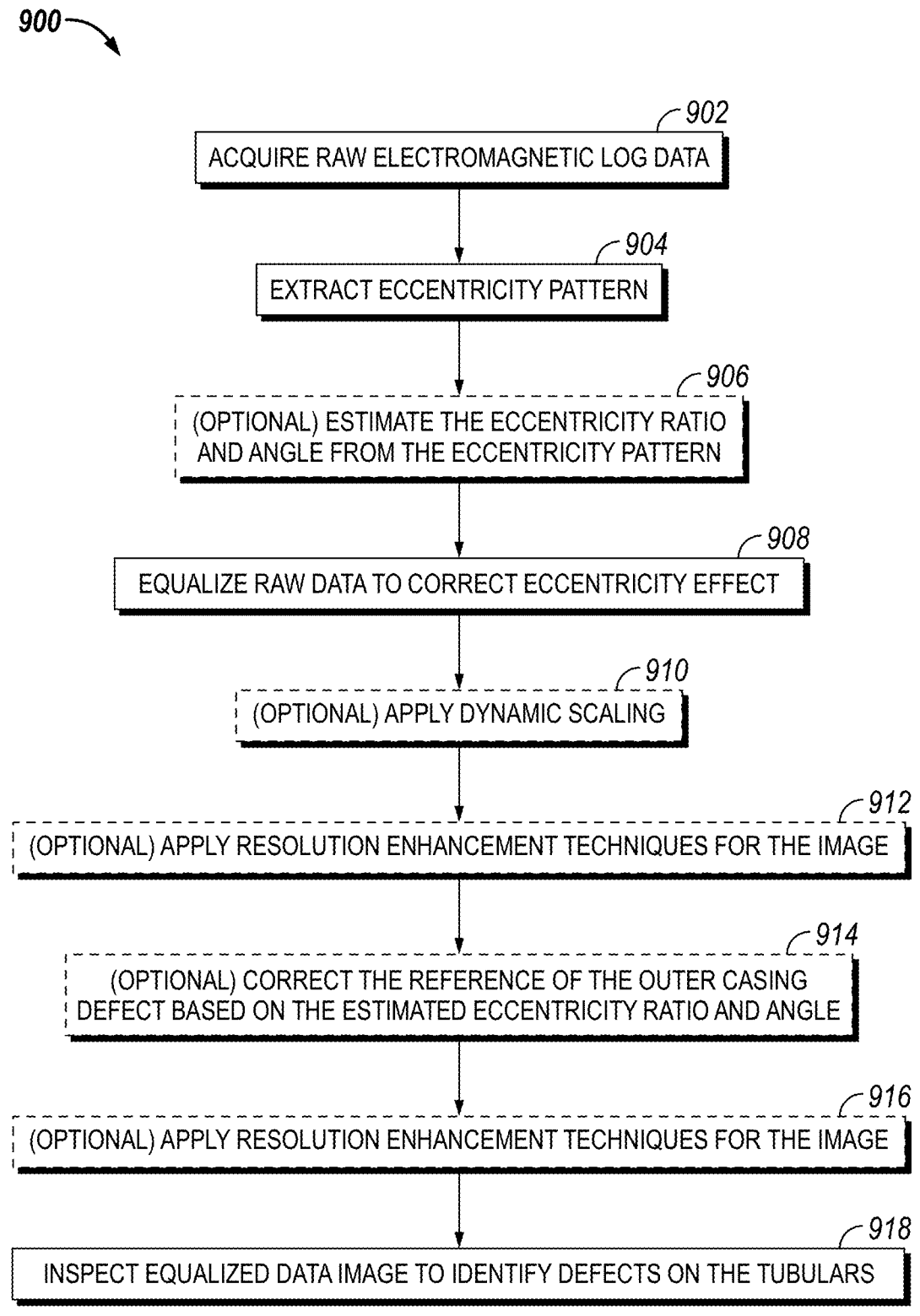

*900*

ACQUIRE RAW ELECTROMAGNETIC LOG DATA — *902*

EXTRACT ECCENTRICITY PATTERN — *904*

(OPTIONAL) ESTIMATE THE ECCENTRICITY RATIO AND ANGLE FROM THE ECCENTRICITY PATTERN — *906*

EQUALIZE RAW DATA TO CORRECT ECCENTRICITY EFFECT — *908*

(OPTIONAL) APPLY DYNAMIC SCALING — *910*

(OPTIONAL) APPLY RESOLUTION ENHANCEMENT TECHNIQUES FOR THE IMAGE — *912*

(OPTIONAL) CORRECT THE REFERENCE OF THE OUTER CASING DEFECT BASED ON THE ESTIMATED ECCENTRICITY RATIO AND ANGLE — *914*

(OPTIONAL) APPLY RESOLUTION ENHANCEMENT TECHNIQUES FOR THE IMAGE — *916*

INSPECT EQUALIZED DATA IMAGE TO IDENTIFY DEFECTS ON THE TUBULARS — *918*

*FIG. 9*

PROCESSING OF AZIMUTHAL ELECTROMAGNETIC PIPE INSPECTION DATA

BACKGROUND

For oil and gas exploration and production, a network of wells, installations and other conduits may be established by connecting sections of metal pipe together. For example, a well installation may be completed, in part, by lowering multiple sections of metal pipe (e.g., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Electromagnetic (EM) techniques are commonly used to monitor the condition of the pipes in oil/gas wellbore including various kinds of casing strings and tubing. One common EM technique utilizes eddy current (EC). In EC, when the transmitter coil emits the primary transient EM fields, eddy currents are induced in the casing. These eddy currents then produce secondary fields which are received along with the primary fields by the receiver coil. The acquired data may then be employed to perform evaluation of the multiple pipes.

Early detection of metal loss of well components, like production tubing or casing, is of great importance to oil and gas wells management. Currently, the remote field eddy current tools may detect anomalies on multiple nested tubulars. However, this type of tool has low vertical resolution, and it has no azimuthal discrimination. That means the estimated metal loss is an average value of annular section of the pipe within the tool vertical resolution range. Therefore, it may fail to detect tubular flaws, such as cracks, pitting, holes, and any metal loss due to corrosion may result in expensive remedial actions and shut down of production wells.

BRIEF DESCRIPTION OF THE DRAWINGS

These drawings illustrate certain aspects of some examples of the present disclosure and should not be used to limit or define the disclosure.

FIG. 9 is a workflow for creating high resolution corrosion data in an azimuthal and/or axial direction;

DETAILED DESCRIPTION

Figure 1:
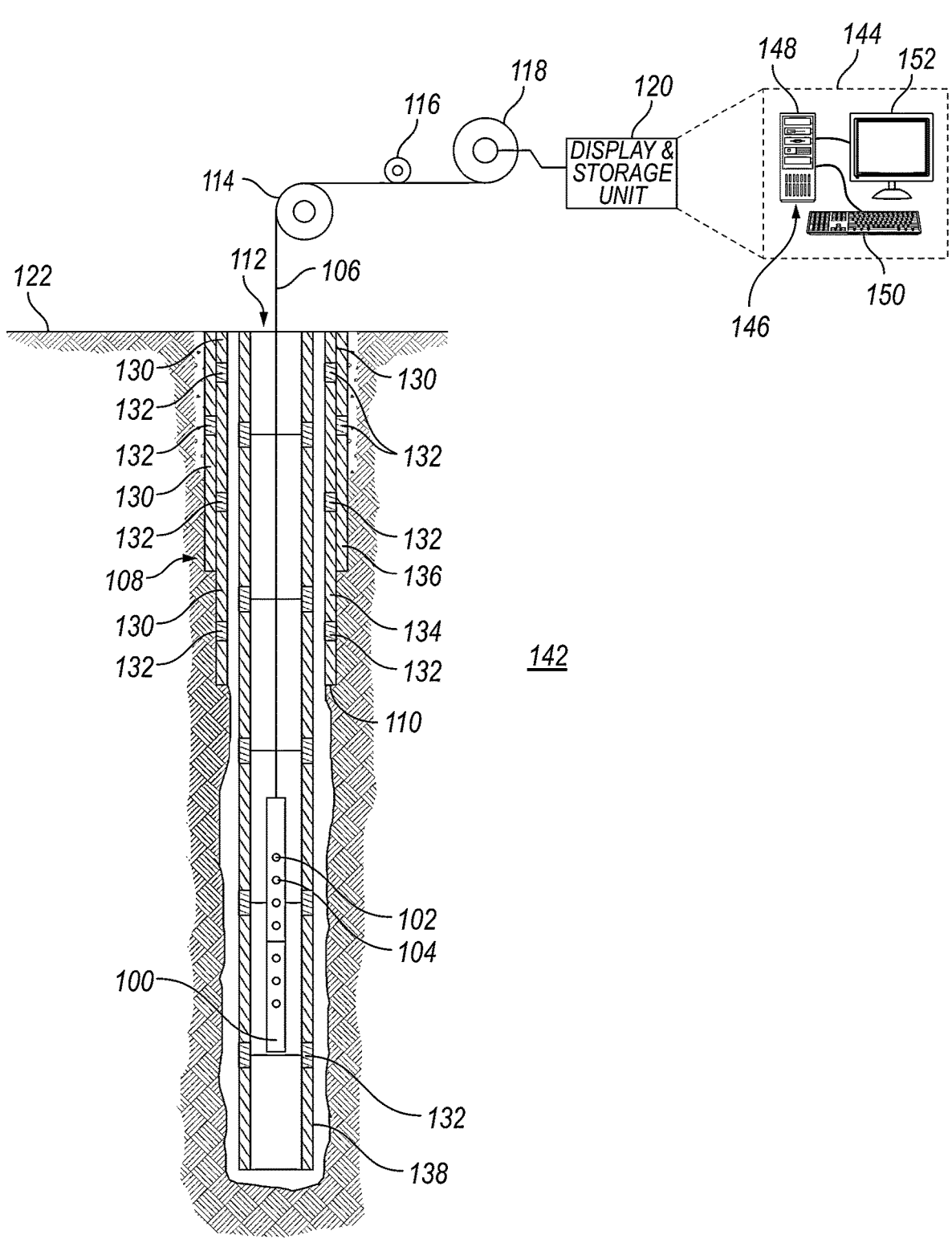
FIG. 1 illustrates an example of an EM logging tool disposed in a wellbore.

This disclosure may generally relate to pipe inspection in subterranean wells and, more particularly, to methods and systems for a workflow of data processing to improve both azimuthal and axial measurement of corrosion on multiple nested tubulars. Processing image data from azimuthal pipe inspection tools remains challenging. Pipe eccentricity may mask defect signals, and defects on the inner pipe can overshadow signals from defects on the outer pipe(s). Data processing workflow is needed to precondition the image data to enable extracting indicative information.

As disclosed herein, a systems and methods may utilize a workflow to improve both azimuthal and axial measurement of corrosion on multiple nested tubulars. The proposed workflow may detect eccentricity and equalize for it. It also applies dynamic scaling to better visualize defects on different pipes. The proposed data processing workflow is able to provide both azimuthal and axial information of a defect with high resolution for at least two nested well tubulars from electromagnetic logging tool measurements.

Electromagnetic (EM) sensing may provide continuous in-situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more).

EM logging tools may measure eddy currents to determine metal loss, location of collars, and use magnetic cores with one or more coils to detect defects in multiple concentric pipes. The EM logging tools may use pulse eddy current (time-domain) and may employ multiple (long, short, and transversal) coils to evaluate multiple types of defects in multiple concentric pipes. It should be noted that the techniques utilized in time-domain may be utilized in frequency-domain measurements. In examples, EM logging tools may operate on a conveyance. Additionally, EM logging tools may include an independent power supply and may store the acquired data on memory.

Monitoring the condition of the production and intermediate casing strings is crucial in oil and gas field operations. EM eddy current (EC) techniques have been successfully used in inspection of these components. EM EC techniques include two broad categories: frequency-domain EC techniques and time-domain EC techniques. In both techniques, one or more transmitters are excited with an excitation signal, and the signals from the pipes are received and recorded for interpretation. The magnitude of a received signal is typically inversely proportional to the amount of metal that is present in the inspection location. For example, less signal magnitude is typically an indication of more metal, and more signal magnitude is an indication of less metal or more metal. This relationship may allow for measurements of metal loss, which typically is due to an anomaly related to the pipe such as corrosion or buckling. Metal gain may indicate the presence of a collar.

FIG. 1 illustrates an operating environment for an EM logging tool 100 as disclosed herein in accordance with some embodiments. EM logging tool 100 may comprise a transmitter 102 and/or a receiver 104. In examples, transmitters 102 and receivers 104 may be coil antennas. Furthermore, transmitter 102 and receiver 104 may be separated by a space between about 0.1 inches (0.254 cm) to about 200 inches (508 cm). In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104 or vice versa. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in wellbore 110.

Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may include an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100 in casing string 108.

A typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. Such as, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

EM logging tool 100 may include a digital telemetry system which may further include one or more electrical circuits, not illustrated, to supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within EM logging tool 100 and data provided by EM logging tool 100 may be stored within EM logging tool 100, rather than transmitted to the surface to display and storage unit 120 during logging operations. The data may include signals and measurements related to corrosion detection.

During operations, transmitter 102 may broadcast electromagnetic fields into subterranean formation 142. It should be noted that broadcasting electromagnetic fields may also be referred to as transmitting electromagnetic fields. The electromagnetic fields transmitted from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed and/or measured by receivers 104. Characterization of casing string 108 and pipe string 138, including determination of pipe attributes, may be performed by measuring and processing primary and secondary electromagnetic fields. Pipe attributes may include, but are not limited to, pipe thickness, pipe conductivity, and/or pipe permeability.

As illustrated, receivers 104 may be positioned on EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Broadcasting of EM fields by transmitter 102 and the sensing and/or measuring of secondary electromagnetic fields by receivers 104 may be controlled by display and storage unit 120, which may include an information handling system 144. As illustrated, the information handling system 144 may be a component of or be referred to as the display and storage unit 120, or vice-versa. Alternatively, the information handling system 144 may be a component of EM logging tool 100. An information handling system 144 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price.

Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed and/or measured with the primary electromagnetic fields by receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due to the transition of the pulse from "off" to "on" state or from "on" to "off" state (more common). These transient electromagnetic fields produce EC in the concentric pipes (e.g., casing string 108 and pipe string 138). The EC, in turn, produces secondary electromagnetic fields that may be sensed and/or measured by receivers 104 placed at some distance on EM logging tool 100 from transmitter 102, as shown on FIG. 1. Alternatively, the secondary electromagnetic fields may be sensed and/or measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times for first casing 134, for second casing 136, and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. In examples, a remote-field eddy current (RFEC) effect may be observed. In an RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}\,t \tag{1}$$

and the magnitude of the impedance shows the dependence:

$$\exp\left[-2\left(\sqrt{\frac{\omega\mu\sigma}{2}}\right)t\right] \tag{2}$$

where $\omega$ is the angular frequency of the excitation source, $\mu$ is the magnetic permeability of the pipe, $\sigma$ is the electrical conductivity of the pipe, and $t$ is the thickness of the pipe. By using the common definition of skin depth for the metals as:

$$\delta = \sqrt{\frac{2}{\omega\mu\sigma}} \qquad (3)$$

The phase of the impedance varies as:

$$\varphi \cong 2\frac{t}{\delta} \qquad (4)$$

and the magnitude of the impedance shows the dependence:

$$\exp\left[\frac{-2t}{\delta}\right] \qquad (5)$$

In RFEC, the estimated quantity may be the overall thickness of the metal. Thus, for multiple concentric pipes, the estimated parameter may be the overall or sum of the thickness of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
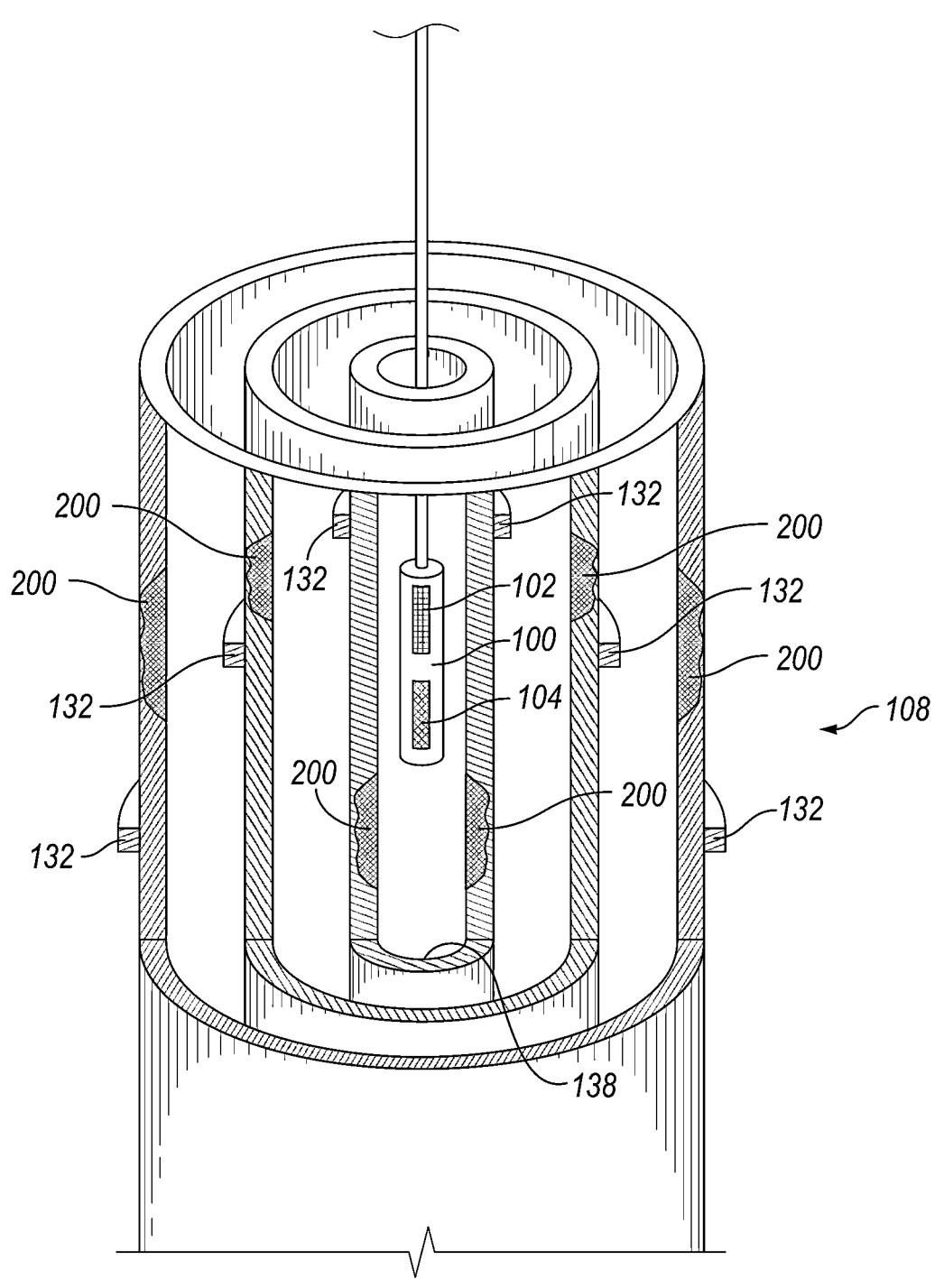
FIG. 2 illustrates an example of arbitrary defects within multiple pipes.
Figures 3A, 3B, 3C, 3D, 3E:
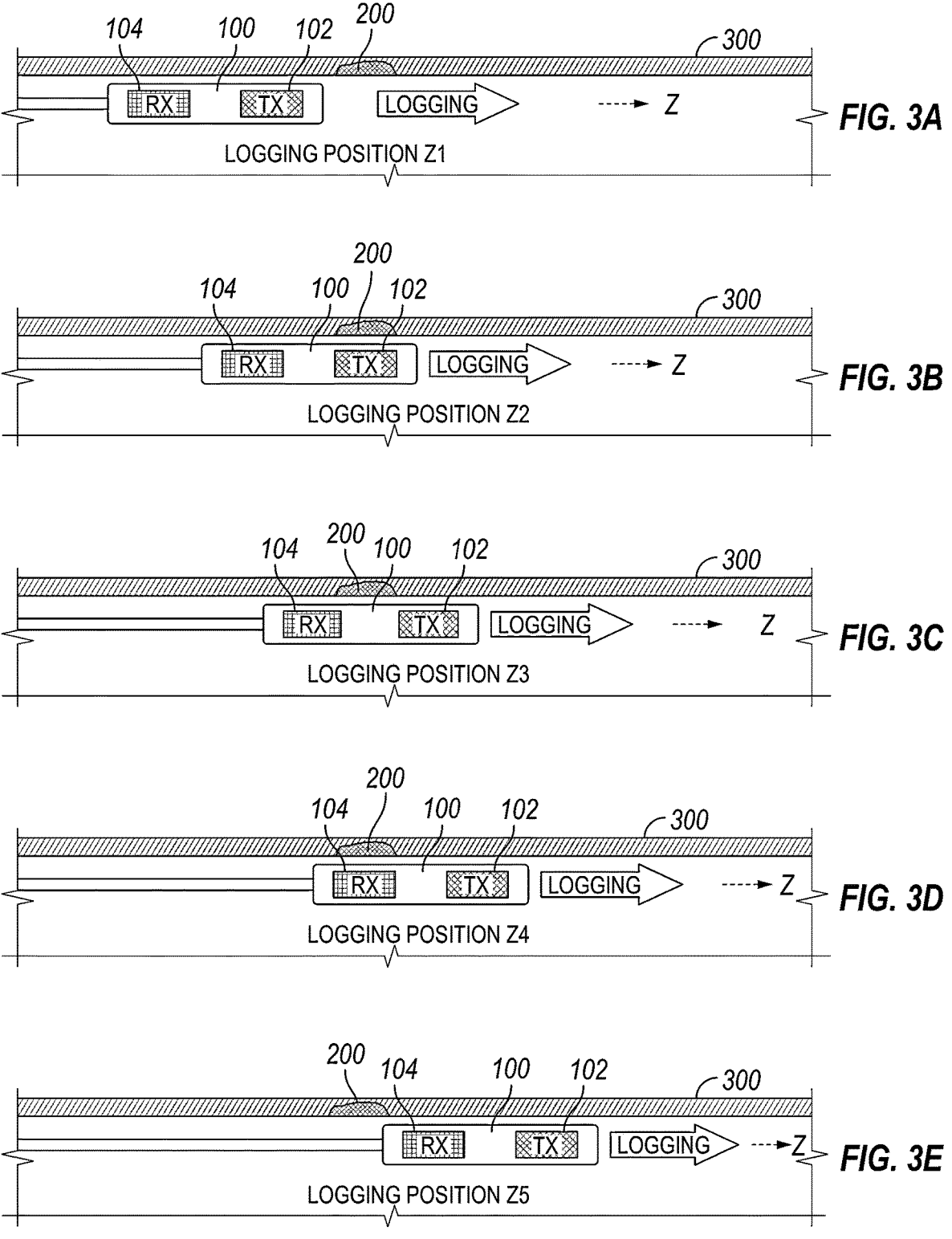
FIG. 3A illustrates an example of an EM logging tool traversing a wellbore.
FIG. 3B illustrates another example of an EM logging tool traversing a wellbore.
FIG. 3C illustrates another example of an EM logging tool traversing a wellbore.
FIG. 3D illustrates another example of an EM logging tool traversing a wellbore.
FIG. 3E illustrates another example of an EM logging tool traversing a wellbore.

FIG. 2 shows EM logging tool 100 disposed in pipe string 138 which may be surrounded by a plurality of nested pipes (e.g., first casing 134 and second casing 136) and an illustration of anomalies 200 disposed within the plurality of nested pipes, in accordance with some embodiments. As EM logging tool 100 moves across pipe string 138 and casing string 108, one or more transmitters 102 may be excited, and a signal (mutual impedance between 102 transmitter and receiver 104) at one or more receivers 104, may be recorded.

Due to eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing, and frequencies may be utilized. For example, short-spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. It should be noted that inversion methods may include model-based inversion which may include forward modeling. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet (1.8 meters)). Due to these complications, methods may need to be used to accurately inspect pipe features.

FIGS. 3A-3E illustrate an electromagnetic inspection and detection of anomalies 200 (e.g., defects) or collars 132 (e.g., Referring to FIG. 2), in accordance with some embodiments. As illustrated, EM logging tool 100 may be disposed in pipe string 138, by a conveyance, which may comprise any number of concentric pipes. As EM logging tool 100 traverses across pipe 300, one or more transmitters 102 may be excited, and a signal (mutual impedance between transmitter 102 and receiver 104) at one or more receivers 104, may be recorded. Due to eddy currents and electromagnetic attenuation, pipe 300 may generate an electrical signal that is in the opposite polarity to the incident signal and results in a reduction in a received signal. Thus, more metal volume translates to greater signal lost. As a result, by inspecting the signal gains, it may be possible to identify zones with metal loss (such as corrosion). Similarly, by inspecting the signal loss, it may be possible to identify metal gain such as due to presence of a casing collar 132 (e.g., Referring to FIG. 1) where two pipes meet with a threaded connection. In order to distinguish signals from different pipes in a multiple concentric pipe configuration, multiple transmitter-receiver spacing, and frequencies may be used. For example, short-spaced transmitters 102 and receivers 104 may be sensitive to pipe string 138, while long spaced transmitters 102 and receivers 104 may be sensitive to deeper pipes (e.g., first casing 124, second casing 136, etc.). By analyzing the signal levels at these different channels through a process of inversion, it may be possible to relate a certain received signal set to a certain set of metal loss or gain at each pipe. In examples, there may be factors that complicate the interpretation and/or identification of collars 132 and/or anomalies 200 (e.g., defects).

For example, due to eddy current physics and electromagnetic attenuation, pipes disposed in pipe string 138 (e.g., referring to FIG. 1 and FIG. 2) may generate an electrical signal that may be in the opposite polarity to the incident signal and results in a reduction in the received signal. Generally, as metal volume increases the signal loss may increase. As a result, by inspecting the signal gains, it may be possible to identify zones with metal loss (such as corrosion). In order to distinguish signals that originate from anomalies 200 (e.g., defects) at different pipes of a multiple nested pipe configuration, multiple transmitter-receiver spacing, and frequencies may be used. For example, short-spaced transmitters 102 and receivers 104 may be sensitive to first pipe string 138 (e.g., referring to FIG. 2), while long spaced transmitters 102 and receivers 104 may be sensitive to deeper (2$^{nd}$, 3$^{rd}$, etc.) pipes (e.g., first casing 134 and second casing 136).

Analyzing the signal levels at different channels with an inversion scheme, it may be possible to relate a certain received signal to a certain metal loss or gain at each pipe. In addition to loss of metal, other pipe properties such as magnetic permeability and electrical conductivity may also be estimated by inversion. There may be several factors that complicate interpretation of losses: (1) deep pipe signals may be significantly lower than other signals; (2) double dip indications appear for long spaced transmitters 102 and receivers 104; (3) spatial spread of long spaced transmitter-receiver signal for a collar 132 may be long (up to 6 feet); (4) to accurately estimate of individual pipe thickness, the material properties of the pipes (such as magnetic permeability and electrical conductivity) may need to be known with fair accuracy; (5) inversion may be a non-unique process, which means that multiple solutions to the same problem may be obtained and a solution which may be most physically reasonable may be chosen. Due to these complications, an advanced algorithm or workflow may be used to accurately inspect pipe features, for example when more than two pipes may be present in pipe string 138.

During logging operations as EM logging tool 100 traverses across pipe 300 (e.g., referring to FIG. 3), an EM log of the received signals may be produced and analyzed. The EM log may be calibrated prior to running inversion to account for the deviations between measurement and simulation (forward model). The deviations may arise from several factors, including the nonlinear behavior of the magnetic core, magnetization of pipes, mandrel effect, and inaccurate well plans. Multiplicative coefficients and constant factors may be applied, either together or individually, to the measured EM log for this calibration.

Figure 4:
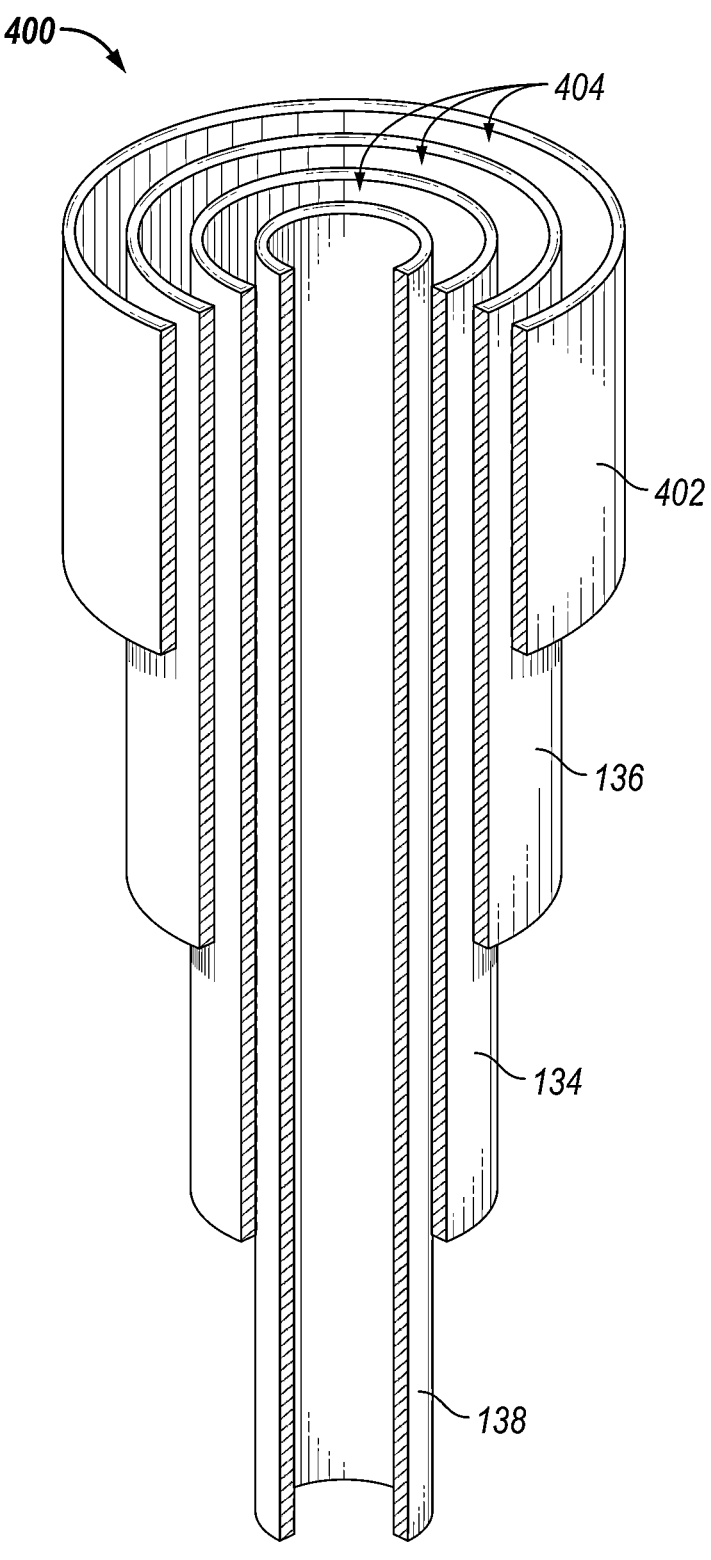
FIG. 4 illustrates an example of a well plan.

FIG. 4 illustrates an example of a well plan 400 in accordance with some embodiments. Depending on the design of well plan 400, well construction may have between two and four main components. These components include conductor, surface, intermediate and production casings. After completion of the well, tubing may be inserted to pump hydrocarbon products. In this example, well plan 400 may comprise pipe string 138, first casing 134, second casing 136, a conductor casing 402, and wherein cement may be disposed in annulus 404 between each casing. However, it should be noted that well plan 400 may include any number of pipes, casings, tubulars, and/or the like. Well plan 400 is not limited or bound by the four pipes that are displayed in FIG. 4. When EM logging tool 100 is used to monitor the pipe condition a log may be produced.

Monitoring the condition of the casing strings is crucial in oil and gas field operations. As discussed above, EM techniques may be used to inspect pipes, casings, tubulars, and/or the like. Measurements taken by EM logging tool 100 may further be processed by information handling system 144 (e.g., referring to FIG. 1).

Figure 5:
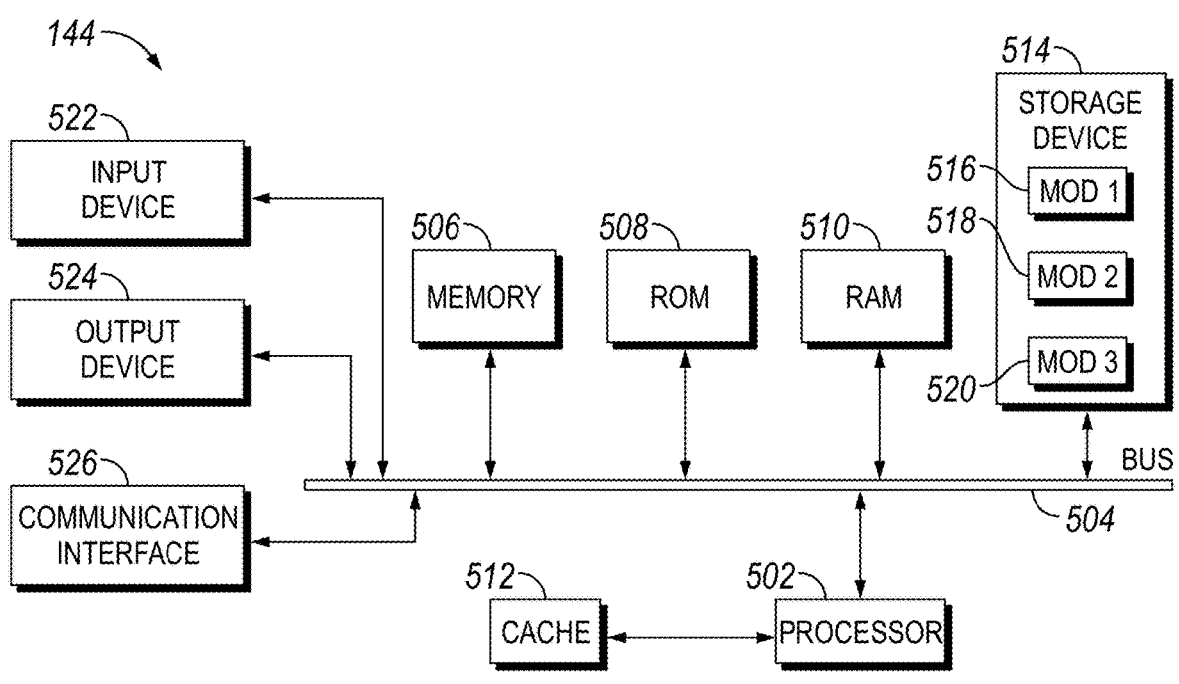
FIG. 5 illustrates a schematic of an information handling system.

FIG. 5 further illustrates an example information handling system 144 which may be employed to perform various steps, methods, and techniques disclosed herein. Persons of ordinary skill in the art will readily appreciate that other system examples are possible. As illustrated, information handling system 144 includes a processing unit (CPU or processor) 502 and a system bus 504 that couples various system components including system memory 506 such as read only memory (ROM) 508 and random-access memory (RAM) 510 to processor 502. Processors disclosed herein may all be forms of this processor 502. Information handling system 144 may include a cache 512 of high-speed memory connected directly with, in close proximity to, or integrated as part of processor 502. Information handling system 144 copies data from memory 506 and/or storage device 514 to cache 512 for quick access by processor 502. In this way, cache 512 provides a performance boost that avoids processor 502 delays while waiting for data. These and other modules may control or be configured to control processor 502 to perform various operations or actions. Other system memory 506 may be available for use as well. Memory 506 may include multiple different types of memory with different performance characteristics. It may be appreciated that the disclosure may operate on information handling system 144 with more than one processor 502 or on a group or cluster of computing devices networked together to provide greater processing capability. Processor 502 may include any general-purpose processor and a hardware module or software module, such as first module 516, second module 518, and third module 520 stored in storage device 514, configured to control processor 502 as well as a special-purpose processor where software instructions are incorporated into processor 502. Processor 502 may be a self-contained computing system, containing multiple cores or processors, a bus, memory controller, cache, etc. A multi-core processor may be symmetric or asymmetric. Processor 502 may include multiple processors, such as a system having multiple, physically separate processors in different sockets, or a system having multiple processor cores on a single physical chip. Similarly, processor 502 may include multiple distributed processors located in multiple separate computing devices but working together such as via a communications network. Multiple processors or processor cores may share resources such as memory 506 or cache 512 or may operate using independent resources. Processor 502 may include one or more state machines, an application specific integrated circuit (ASIC), or a programmable gate array (PGA) including a field PGA (FPGA).

Each individual component discussed above may be coupled to system bus 504, which may connect each and every individual component to each other. System bus 504 may be any of several types of bus structures including a memory bus or memory controller, a peripheral bus, and a local bus using any of a variety of bus architectures. A basic input/output (BIOS) stored in ROM 508 or the like, may provide the basic routine that helps to transfer information between elements within information handling system 144, such as during start-up. Information handling system 144 further includes storage devices 514 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 514 may include software modules 516, 518, and 520 for controlling processor 502. Information handling system 144 may include other hardware or software modules. Storage device 514 is connected to the system bus 504 by a drive interface. The drives and the associated computer-readable storage devices provide nonvolatile storage of computer-readable instructions, data structures, program modules and other data for information handling system 144. In one aspect, a hardware module that performs a particular function includes the software component stored in a tangible computer-readable storage device in connection with the necessary hardware components, such as processor 502, system bus 504, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 144 is a small, handheld computing device, a desktop computer, or a computer server. When processor 502 executes instructions to perform "operations", processor 502 may perform the operations directly and/or facilitate, direct, or cooperate with another device or component to perform the operations.

As illustrated, information handling system 144 employs storage device 514, which may be a hard disk or other types of computer-readable storage devices which may store data that are accessible by a computer, such as magnetic cassettes, flash memory cards, digital versatile disks (DVDs), cartridges, random access memories (RAMs) 210, read only memory (ROM) 508, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per sc.

To enable user interaction with information handling system 144, an input device 522 represents any number of input mechanisms, such as a microphone for speech, a touch-sensitive screen for gesture or graphical input, keyboard, mouse, motion input, speech and so forth. Additionally, input device 522 may receive one or more EM measurements from EM logging tool 100 (e.g., referring to FIG. 1), discussed above. An output device 524 may also be one or more of a number of output mechanisms known to those of skill in the art. In some instances, multimodal systems enable a user to provide multiple types of input to communicate with information handling system 144. Communications interface 526 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 502, that is purpose-built to operate as an equivalent to software executing on a general purpose processor. For example, the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 508 for storing software performing the operations described below, and random-access memory (RAM) 510 for storing results. Very large-scale integration (VLSI) hardware embodiments, as well as custom VLSI circuitry in combination with a general-purpose DSP circuit, may also be provided.

Figure 6:
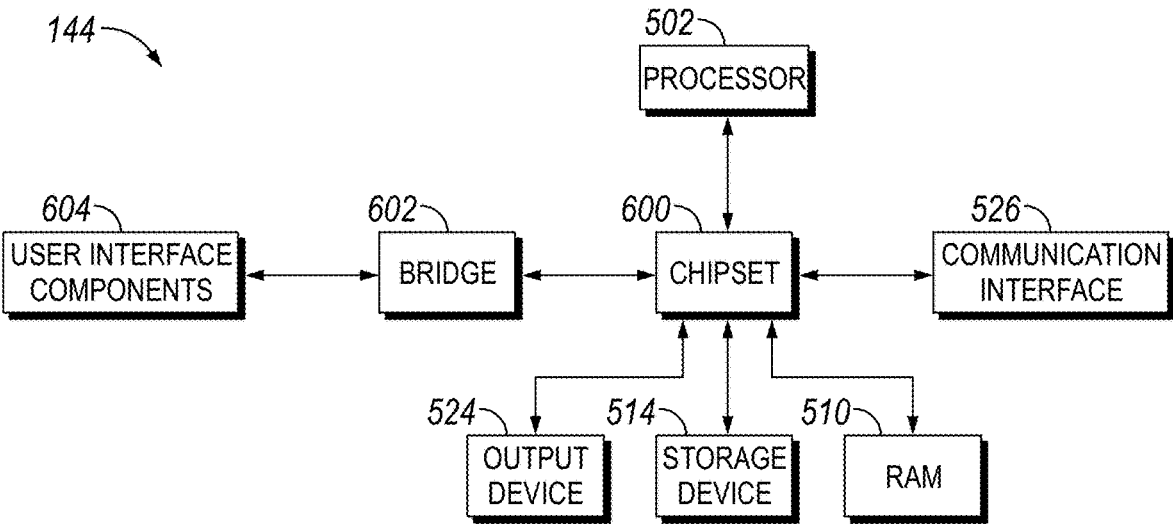
FIG. 6 illustrates a schematic of a chip set.

FIG. 6 illustrates an example information handling system 144 having a chipset architecture that may be used in executing the described method and generating and displaying a graphical user interface (GUI). Information handling system 144 is an example of computer hardware, software, and firmware that may be used to implement the disclosed technology. Information handling system 144 may include a processor 502, representative of any number of physically and/or logically distinct resources capable of executing software, firmware, and hardware configured to perform identified computations. Processor 502 may communicate with a chipset 600 that may control input to and output from processor 502. In this example, chipset 600 outputs information to output device 524, such as a display, and may read and write information to storage device 514, which may include, for example, magnetic media, and solid-state media. Chipset 600 may also read data from and write data to RAM 510. A bridge 602 for interfacing with a variety of user interface components 604 may be provided for interfacing with chipset 600. Such user interface components 604 may include a keyboard, a microphone, touch detection and processing circuitry, a pointing device, such as a mouse, and so on. In general, inputs to information handling system 144 may come from any of a variety of sources, machine generated and/or human generated.

Chipset 600 may also interface with one or more communication interfaces 526 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 502 analyzing data stored in storage device 514 or RAM 510. Further, information handling system 144 receives inputs from a user via user interface components 604 and executes appropriate functions, such as browsing functions by interpreting these inputs using processor 502.

In examples, information handling system 144 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (cither hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

Figure 7:
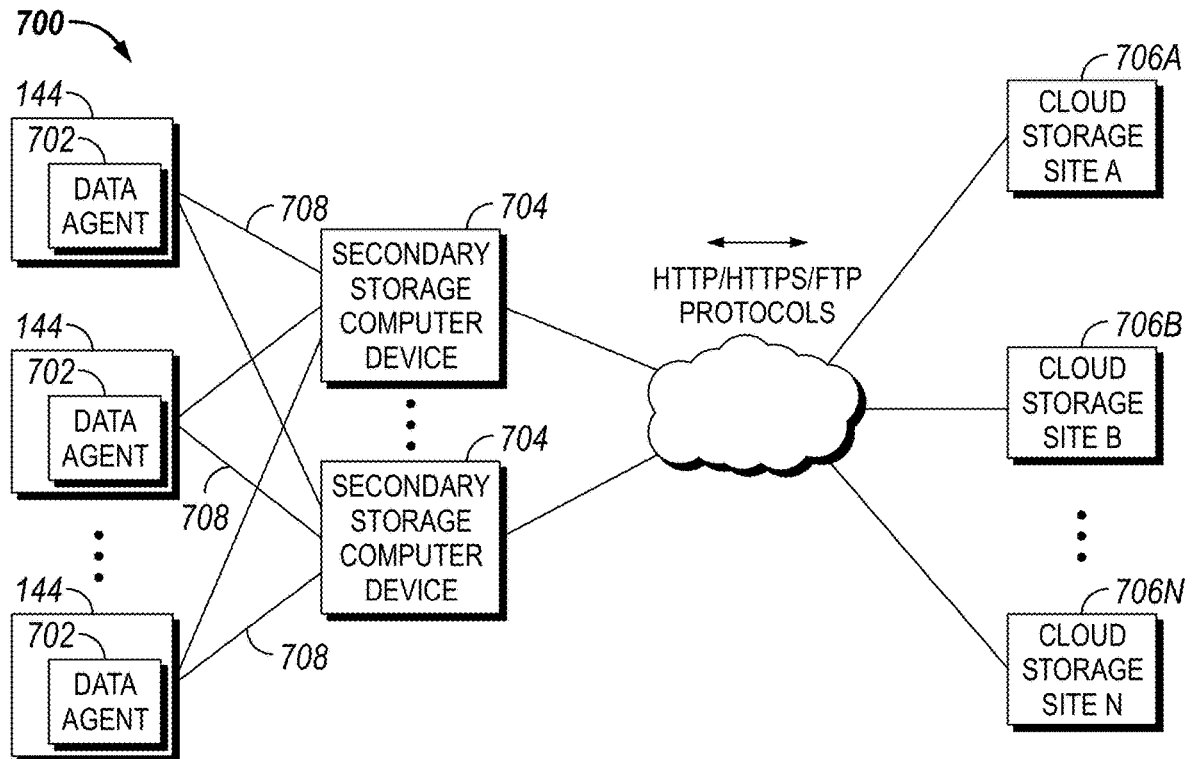
FIG. 7 illustrates a computing network.

FIG. 7 illustrates an example of one arrangement of resources in a computing network 700 that may employ the processes and techniques described herein, although many others are of course possible. As noted above, an information handling system 144, as part of their function, may utilize data, which includes files, directories, metadata (e.g., access control list (ACLS) creation/edit dates associated with the data, etc.), and other data objects. The data on the information handling system 144 is typically a primary copy (e.g., a production copy). During a copy, backup, archive or other storage operation, information handling system 144 may send a copy of some data objects (or some components thereof) to a secondary storage computing device 704 by utilizing one or more data agents 702.

A data agent 702 may be a desktop application, website application, or any software-based application that is run on information handling system 144. As illustrated, information handling system 144 may be disposed at any rig site (e.g., referring to FIG. 1), off site location, or repair and manufacturing center. The data agent may communicate with a secondary storage computing device 704 using communication protocol 708 in a wired or wireless system. Communication protocol 708 may function and operate as an input to a website application. In the website application, field data related to pre- and post-operations, generated DTCs, notes, and the like may be uploaded. Additionally, information handling system 144 may utilize communication protocol 708 to access processed measurements, operations with similar DTCs, troubleshooting findings, historical run data, and/or the like. This information is accessed from secondary storage computing device 704 by data agent 702, which is loaded on information handling system 144.

Secondary storage computing device 704 may operate and function to create secondary copies of primary data objects (or some components thereof) in various cloud storage sites 706A-N. Additionally, secondary storage computing device 704 may run determinative algorithms on data uploaded from one or more information handling systems 144, discussed further below. Communications between the secondary storage computing devices 704 and cloud storage sites 706A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 706A-N, the secondary storage computing device 704 may also perform local content indexing and/or local object-level, sub-object-level or block-level deduplication when performing storage operations involving various cloud storage sites 706A-N. Cloud storage sites 706A-N may further record and maintain, EM logs, map DTC codes, store repair and maintenance data, store operational data, and/or provide outputs from determinative algorithms that are located in cloud storage sites 706A-N. In a non-limiting example, this type of network may be utilized as a platform to store, backup, analyze, import, preform extract, transform and load ("ETL") processes, mathematically process, apply machine learning models, and augment EM measurement data sets.

A machine learning model may be an empirically derived model which may result from a machine learning algorithm identifying one or more underlying relationships within a dataset. In comparison to a physics-based model, such as Maxwell's Equations, which are derived from first principles and define the mathematical relationship of a system, a pure machine learning model may not be derived from first principles. Once a machine learning model is developed, it may be queried in order to predict one or more outcomes for a given set of inputs. The type of input data used to query the model to create the prediction may correlate both in category and type to the dataset from which the model was developed.

The structure of, and the data contained within a dataset provided to a machine learning algorithm may vary depending on the intended function of the resulting machine learning model. The rows of data, or data points, within a dataset may contain one or more independent values. Additionally, datasets may contain corresponding dependent values. The independent values of a dataset may be referred to as "features," and a collection of features may be referred to as a "feature space." If dependent values are available in a dataset, they may be referred to as outcomes or "target values." Although dependent values may be a necessary component of a dataset for certain algorithms, not all algorithms require a dataset with dependent values. Furthermore, both the independent and dependent values of the dataset may comprise either numerical or categorical values.

While it may be true that machine learning model development is more successful with a larger dataset, it may also be the case that the whole dataset isn't used to train the model. A test dataset may be a portion of the original dataset which is not presented to the algorithm for model training purposes. Instead, the test dataset may be used for what may be known as "model validation," which may be a mathematical evaluation of how successfully a machine learning algorithm has learned and incorporated the underlying relationships within the original dataset into a machine learning model. This may include evaluating model performance according to whether the model is over-fit or under-fit. As it may be assumed that all datasets contain some level of error, it may be important to evaluate and optimize the model performance and associated model fit by means of model validation. In general, the variability in model fit (e.g.: whether a model is over-fit or under-fit) may be described by the "bias-variance trade-off." As an example, a model with high bias may be an under-fit model, where the developed model is over-simplified, and has either not fully learned the relationships within the dataset or has over-generalized the underlying relationships. A model with high variance may be an over-fit model which has overlearned about non-generalizable relationships within training dataset which may not be present in the test dataset. In a non-limiting example, these non-generalizable relationships may be driven by factors such as intrinsic error, data heterogeneity, and the presence of outliers within the dataset. The selected ratio of training data to test data may vary based on multiple factors, including, in a non-limiting example, the homogeneity of the dataset, the size of the dataset, the type of algorithm used, and the objective of the model. The ratio of training data to test data may also be determined by the validation method used, wherein some non-limiting examples of validation methods include k-fold cross-validation, stratified k-fold cross-validation, bootstrapping, leave-one-out cross-validation, resubstitution, random sub-sampling, and percentage hold-out.

In addition to the parameters that exist within the dataset, such as the independent and dependent variables, machine learning algorithms may also utilize parameters referred to as "hyperparameters." Each algorithm may have an intrinsic set of hyperparameters which guide what and how an algorithm learns about the training dataset by providing limitations or operational boundaries to the underlying mathematical workflows on which the algorithm functions. Furthermore, hyperparameters may be classified as either model hyperparameters or algorithm parameters.

Model hyperparameters may guide the level of nuance with which an algorithm learns about a training dataset, and as such model hyperparameters may also impact the performance or accuracy of the model that is ultimately generated. Modifying or tuning the model hyperparameters of an algorithm may result in the generation of substantially different models for a given training dataset. In some cases, the model hyperparameters selected for the algorithm may result in the development of an over-fit or under-fit model. As such, the level to which an algorithm may learn the underlying relationships within a dataset, including the intrinsic error, may be controlled to an extent by tuning the model hyperparameters.

Model hyperparameter selection may be optimized by identifying a set of hyperparameters which minimize a predefined loss function. An example of a loss function for a supervised regression algorithm may include the model error, wherein the optimal set of hyperparameters correlates to a model which produces the lowest difference between the predictions developed by the produced model and the dependent values in the dataset. In addition to model hyperparameters, algorithm hyperparameters may also control the learning process of an algorithm, however algorithm hyperparameters may not influence the model performance. Algorithm hyperparameters may be used to control the speed and quality of the machine learning process. As such, algorithm hyperparameters may affect the computational intensity associated with developing a model from a specific dataset.

Machine learning algorithms, which may be capable of capturing the underlying relationships within a dataset, may be broken into different categories. One such category may include whether the machine learning algorithm functions using supervised, unsupervised, semi-supervised, or reinforcement learning. The objective of a supervised learning algorithm may be to determine one or more dependent variables based on their relationship to one or more independent variables. Supervised learning algorithms are named as such because the dataset includes both independent and corresponding dependent values where the dependent value may be thought of as "the answer," that the model is seeking to predict from the underlying relationships in the dataset. As such, the objective of a model developed from a supervised learning algorithm may be to predict the outcome of one or more scenarios which do not yet have a known outcome. Supervised learning algorithms may be further divided according to their function as classification and regression algorithms. When the dependent variable is a label or a categorical value, the algorithm may be referred to as a classification algorithm. When the dependent variable is a continuous numerical value, the algorithm may be a regression algorithm. In a non-limiting example, algorithms utilized for supervised learning may include Neural Networks, K-Nearest Neighbors, Naïve Bayes, Decision Trees, Classification Trees, Regression Trees, Random Forests, Linear Regression, Support Vector Machines (SVM), Gradient Boosting Regression, and Perception Back-Propagation.

The objective of unsupervised machine learning may be to identify similarities and/or differences between the data points within the dataset which may allow the dataset to be divided into groups or clusters without the benefit of knowing which group or cluster the data may belong to. Datasets utilized in unsupervised learning may not include a dependent variable as the intended function of this type of algorithm is to identify one or more groupings or clusters within a dataset. In a non-limiting example, algorithms which may be utilized for unsupervised machine learning may include K-means clustering, K-means classification, Fuzzy C-Means, Gaussian Mixture, Hidden Markov Model, Neural Networks, and Hierarchical algorithms.

Figure 8:
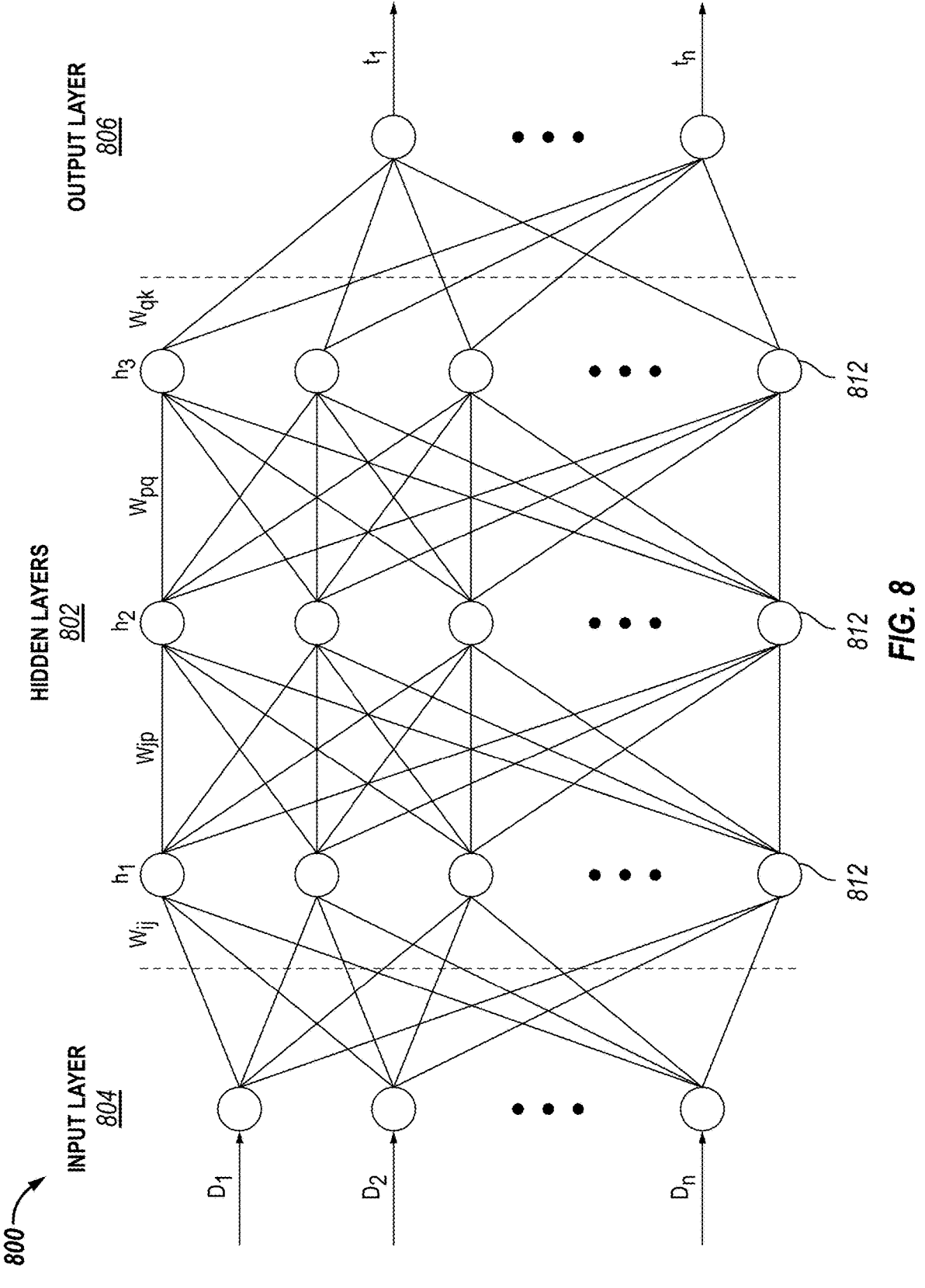
FIG. 8 illustrates a neural network.
Figures 10A, 10B, 10C:
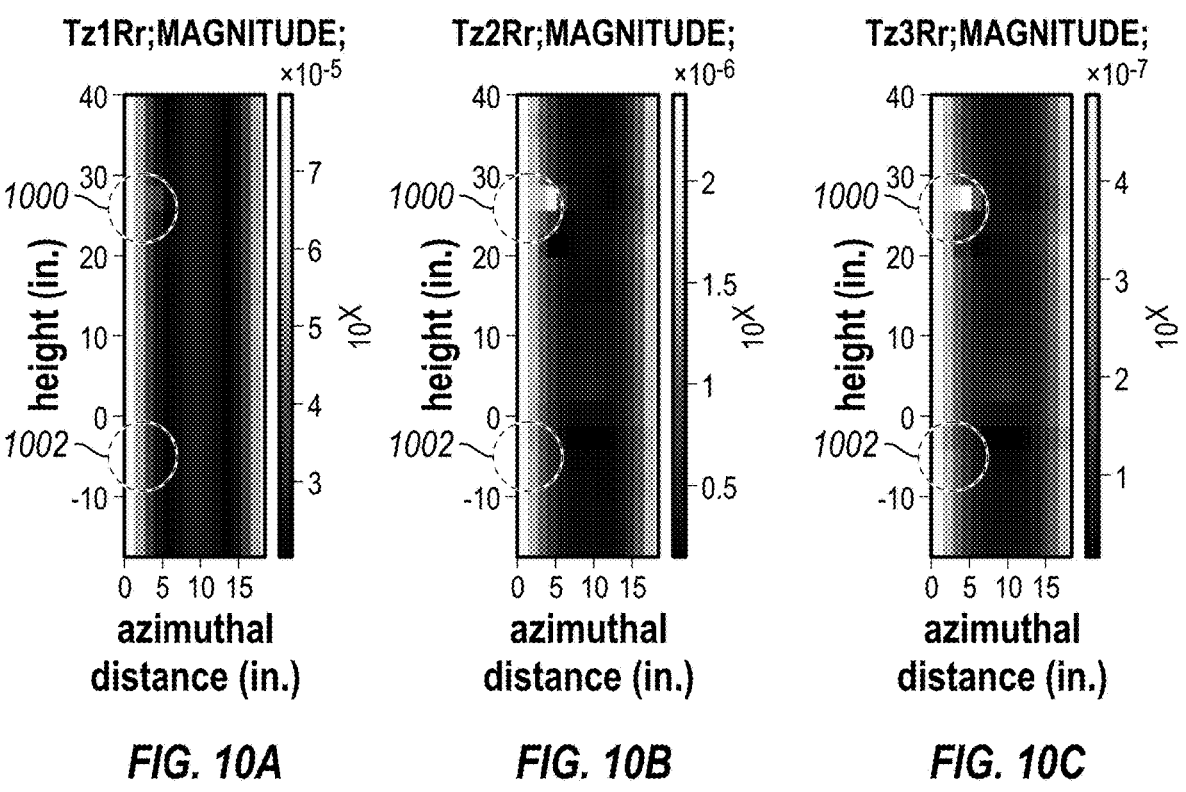
FIGS. 10A-10F illustrate images taken during a measurement operation with an electromagnetic logging tool.
Figures 10D, 10E, 10F:
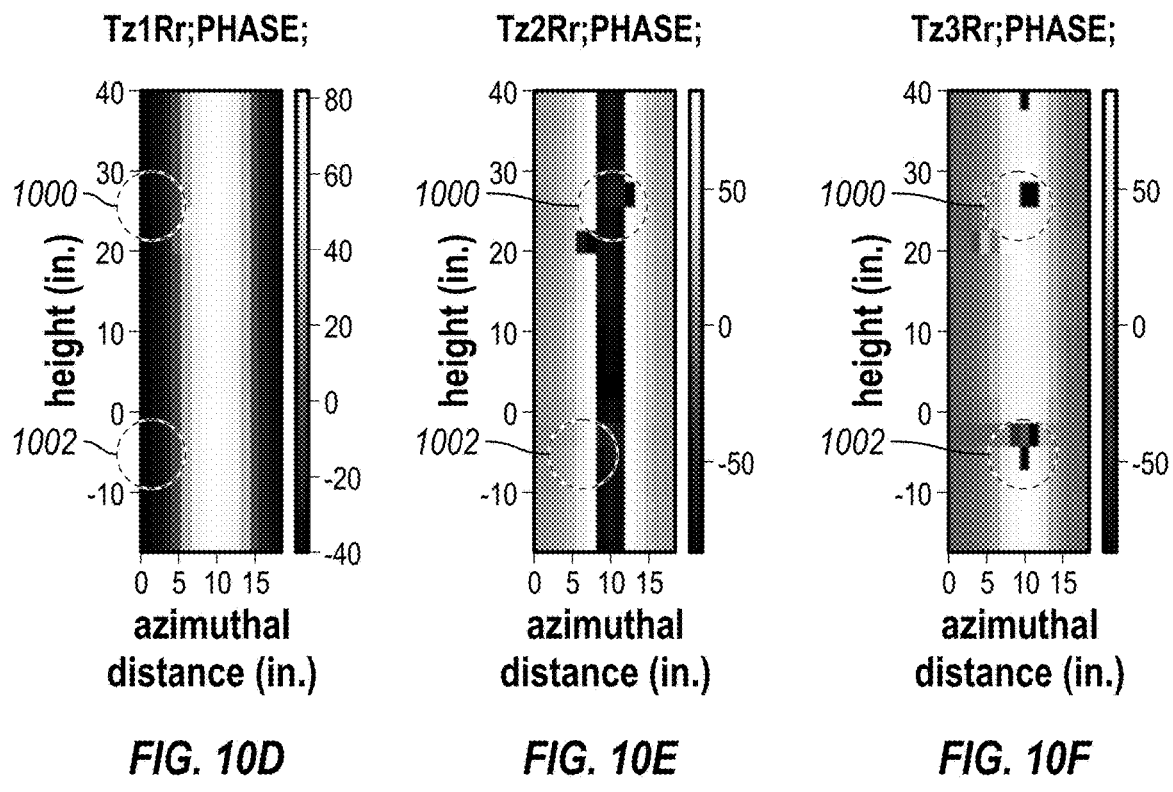
Figures 11A, 11B, 11C, 11D, 11E, 11F:
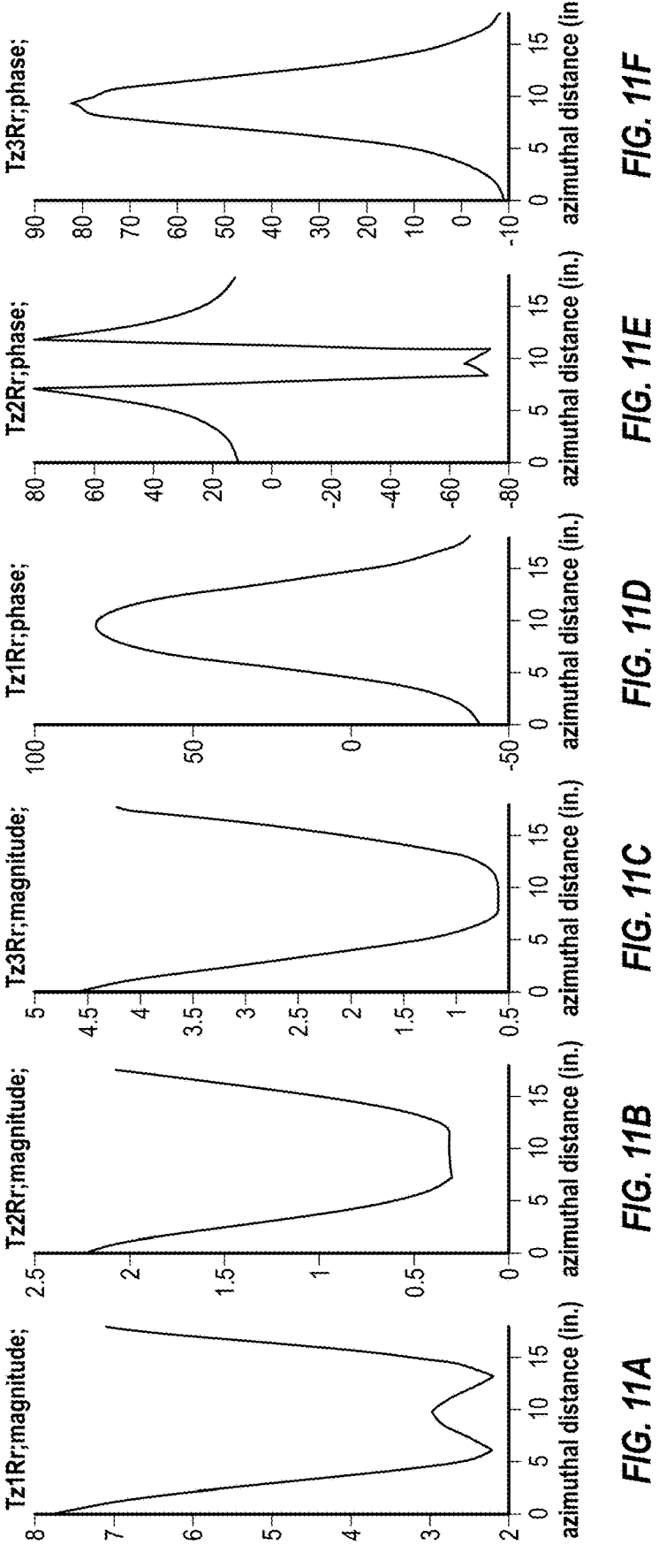
FIGS. 11A-11F are graphs of extracted raw eccentricity pattern from the images in FIGS. 10A-10F illustrate.
Figures 12A, 12B, 12C, 12D, 12E, 12F:
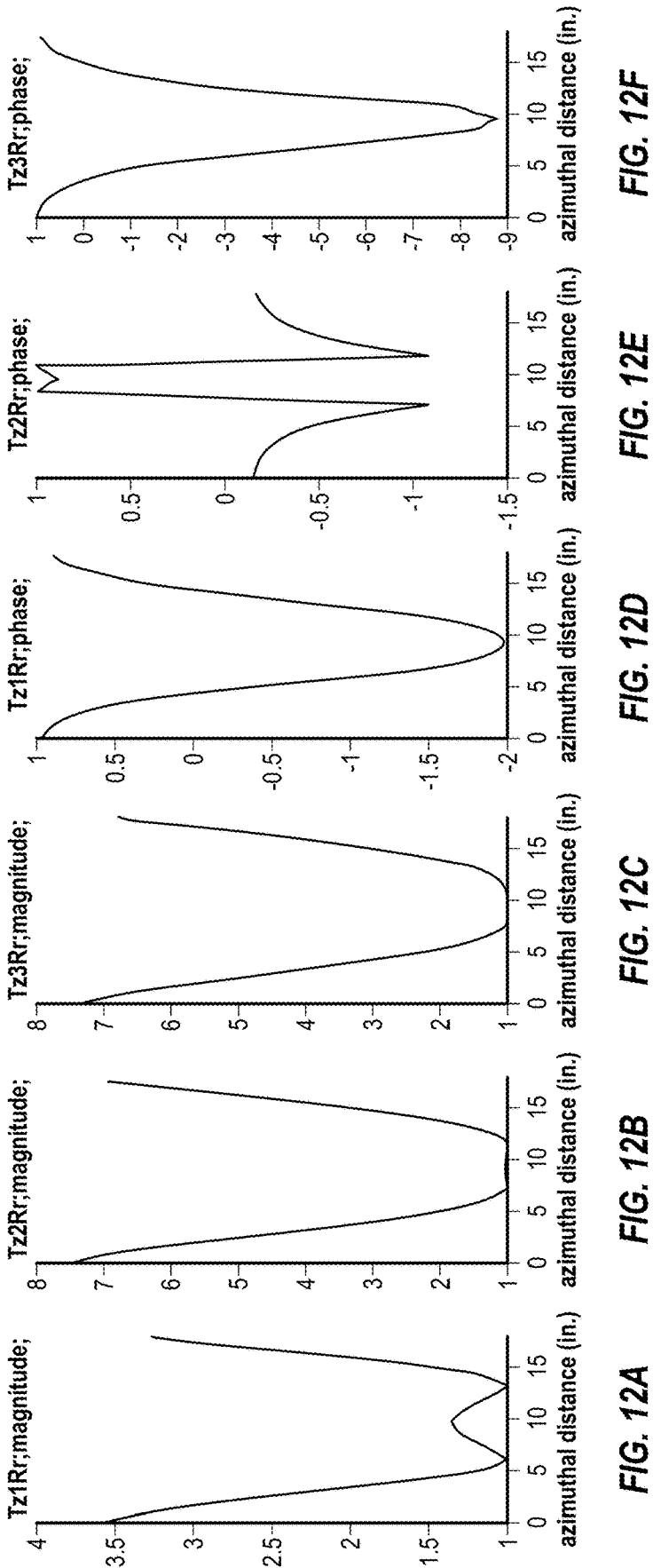
FIGS. 12A-12F are graphs of the normalization or the raw eccentricity pattern from FIGS. 11A-11F illustrate.

In examples to determine a relationship using machine learning, a neural network (NN) 800, as illustrated in FIG. 8, may be utilized to locate collars on one or more pipe strings and/or casings in a well plan 400 (e.g., referring to FIG. 4). A NN 800 is an artificial neural network with one or more hidden layers 802 between input layer 804 and output layer 806. As illustrated, input layer 804 may include all extracted electromagnetic responses from EM logging tool 100 (e.g., referring to FIG. 1), and output layers 806 may include pipe information from other sources. During operations, input data is taken by neurons 812 in first layer which then provides an output to the neurons 812 within next layer and so on which provides a final output in output layer 806. Each layer may have one or more neurons 812. The connection between two neurons 812 of successive layers may have an associated weight. The weight defines the influence of the input to the output for the next neuron 812 and eventually for the overall final output. The training process of NN 800 may be utilized to determine azimuthal and axial information of corrosion in high resolution.

FIG. 9 is a workflow 900 for creating high resolution corrosion data in an azimuthal and/or axial direction. Further, workflow 900 may correct image data for artifacts such as eccentricity so that defects may be clearly identified. Artifacts and defects are not necessarily the same. In examples, artifacts may show as incorrect defects. It should be noted that workflow 900 may be at least partially performed on information handling system 144 (e.g., referring to FIG. 1) and/or NN 800, (e.g., referring to FIG. 8). Further, information handling system may be communicatively coupled with one or more transmitters 102 and one or more receivers 104 (e.g., referring to FIG. 1) and disposed downhole, on the surface, or at a remote location.

Workflow 900 may begin with block 902. In block 902, a raw electromagnetic log may be acquired. This may be performed during measurement operations described above. For example, EM logging tool 100 may be disposed within wellbore 110 without removing casing string 108 (e.g., referring to FIG. 1) to obtain multi-frequency and multi-spacing logs. As discussed above, EM logging tool 100 comprises one or more transmitters 102 and one or more receivers 104 (e.g., referring to FIG. 1) that may be utilized to acquire measurements in frequency or time domains, as described above. Eddy current techniques may allow for multiple pipes characterizations. Different depths of penetration and vertical resolutions may be achieved via two or more receivers 104 at the same axial location and two or more transmitters 102 placed at various distances from receivers 102. Transmitters 102 that may be placed at a shorter distance from receivers 104, may measure the response due to the inner pipes of casing string 108 with better axial and vertical resolution. Transmitters 102 that are at longer distances from receivers 104 may measure responses of outer pipes within casing string 108 but with degraded resolution. Thus, the electromagnetic log may be processed to invert all casing information with one run. An electromagnetic log acquired in block 902 may be illustrated in FIGS. 10A-10F. As illustrated, a defect 1000 such as a hole is located on the first (innermost) pipe at 24 inch and 90 degrees, and a second defect 1002 such as a second hole is located on the second (outer) pipe at 0 inch and 180 degrees. It should be noted that defects signatures of defects 1000 and 1002 may be masked by eccentricity between first casing 134 and/or second casing 136 (e.g., referring to FIG. 1).

In block 904 an eccentricity pattern may be extracted. The information from block 902 may be utilized in block 904 to determine the eccentricity pattern. Due to the existence of centralizer, EM logging tool 100 may be able to be centered in casing string 108 (e.g., referring to FIG. 1). However, there could exist eccentricity between first casing 134 and/or second casing 136 (e.g., referring to FIG. 1). As note above in block 902, the existence of eccentricity between tubulars may mask the corrosion and adds great difficulty to estimating the location of corrosion.

To correct the eccentricity effect, the first step is to extract the eccentricity pattern in block 904. The eccentricity pattern may change over depth due to bends in pipe string 138 and/or casing string 108 (e.g., referring to FIG. 1). Therefore, extracting eccentricity pattern may be performed over depth windows. The size of the window may be optimized based on the axial length of the defects and the axial scale of eccentricity variations. For example, the window may be longer than the axial length of defects, such as defects 1000 and 1002, but cannot be a length that may show the eccentricity variations. Windows may be longer than the diameters of defects that may be holes. If defects are cracks, the window needs to cover the whole length of the cracks. In particular, the window may be longer than the defects, and shorter than the bend scale. The scale of bends or eccentricity variation over depth may be deduced from raw data by applying a low-pass or median filter. Typically, bend scale may range from 1 ft (0.3 meter) to 10 ft (3 meters) or 1 ft (0.3 meter) to 20 ft (6 meters) depending on the size of the annulus between the pipes. Additionally, different windows may overlap. The pattern extracted in each window is applied locally to equalize eccentricity within each window. The way to extract eccentricity pattern may be but not limited to extracting the median of the signal of each receiver 104 within a depth window. FIGS. 11A-11F show the extracted raw eccentricity pattern from the log data. As illustrated in FIGS. 11A-11F, there are eccentricity magnitude patterns and eccentricity phase patterns for transmitters 102 at different spacings. In order not to be affected by the signal level but only reflects the eccentricity characteristics, the raw eccentricity pattern may be normalized by the minimum value to get the normalized eccentricity pattern. The results of a normalized eccentricity pattern are illustrated in FIGS. 12A-12F. In examples, eccentricity ratio and angle may be calculated from the normalized eccentricity pattern.

Figures 13, 14:
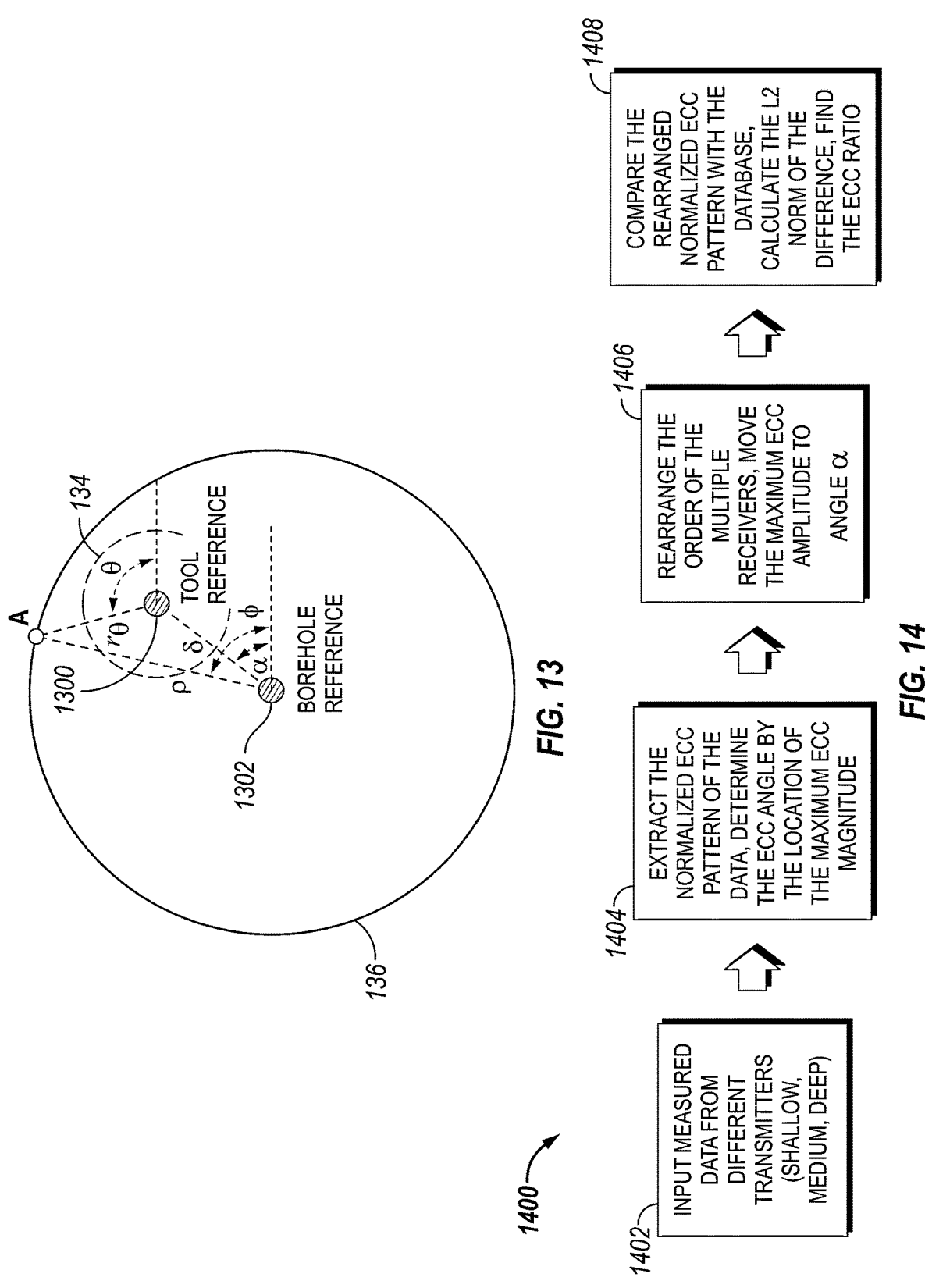
FIG. 13 is a model used to identified distances and angles of the eccentricity pattern.
FIG. 14 is a workflow to estimate the eccentricity angle and ratio from FIG. 13.

In block 906, the normalized eccentricity pattern from block 904 may be optionally utilized to estimate the eccentricity ratio and angle form the eccentricity pattern. FIG. 13 illustrates a model with distances and angles to determine the eccentricity ration and angle. With continued reference to FIG. 13, there are two references. A first reference may be a tool reference 1300 (i.e., located at the center of first casing 134), and the second reference may be a borehole reference 134) (i.e., taken as the center of the second casing 136). If there is no eccentricity, tool reference 1300 and borehole reference 1302 may be disposed at the same location. As all the logging data/images are produced and based on tool reference, if eccentricity exists, tool reference 1300 needs to be transformed to borehole reference 1302.

In examples, there may be a defect at point A. In the tool reference, the azimuthal angle of point A may be θ, while in borehole reference 1302, the actual azimuthal angle of point A is φ, α is the eccentricity angle, δ is the eccentricity distance between tool reference 1300 and borehole reference 1302, ρ is inner radius of second casing 136. After getting the normalized eccentricity pattern from the log data in block 902 (e.g., referring to FIG. 9), a database may be built with normalized eccentricity pattern for all the transmitters 102 (shallow, medium, deep) at a certain eccentric degree α and several eccentricity ratios $$\delta/\delta_{max} \tag{6}$$

where $\delta_{max}$ is the maximum distance that a casing and/or tubular may move from the origin. For example, the ith pipe is decentralized, then $$\delta_{max} = (ID_{i+1} - OD_i)/2 \tag{7}$$

where $ID_{i+1}$ is the inner diameter of the (i+1)th pipe and $OD_i$ is the outer diameter of the ith pipe.

Figure 15:
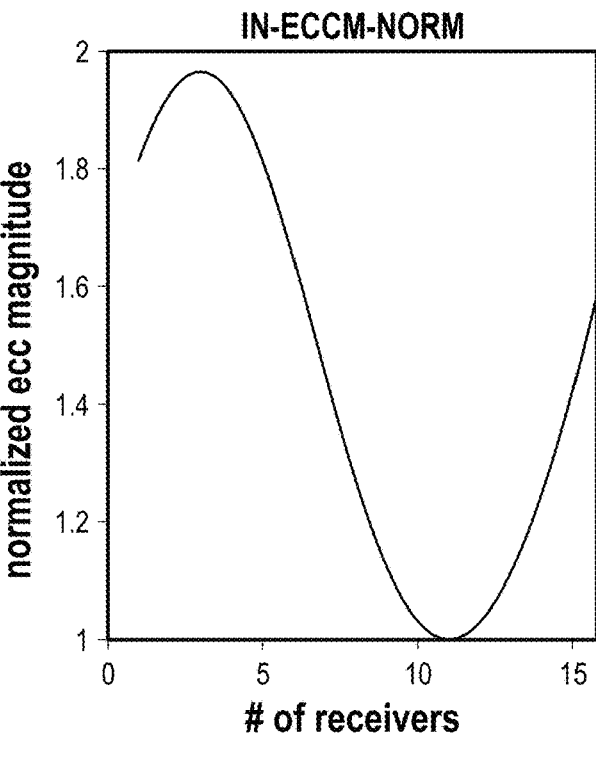
FIG. 15 is a graph of a normalized eccentricity magnitude pattern.

FIG. 14 illustrates workflow to estimate the eccentricity angle and ratio 1400 shown in FIG. 13. Information from block 904 and FIG. 13 may be utilized in workflow 1400 to determine the eccentricity angle and ratio. Further, at least a part of workflow 1400 may be performed on information handling system 144 (e.g., referring to FIG. 1) and/or NN 800 (e.g., referring to FIG. 8). Workflow 1400 may begin with block 1402. In block 1402, measurement data from different transmitters 102 (shallow, medium, deep) may be utilized to form a database, as described above. In block 1404, using the data from the database in block 1402, the normalized eccentricity pattern may be extracted. FIG. 15 shows an example of a normalized eccentricity magnitude pattern. The eccentricity angle may be determined by the location of the maximum magnitude in the eccentricity magnitude pattern, which may be found by rearranging the order of receiver 104.

Figure 16:
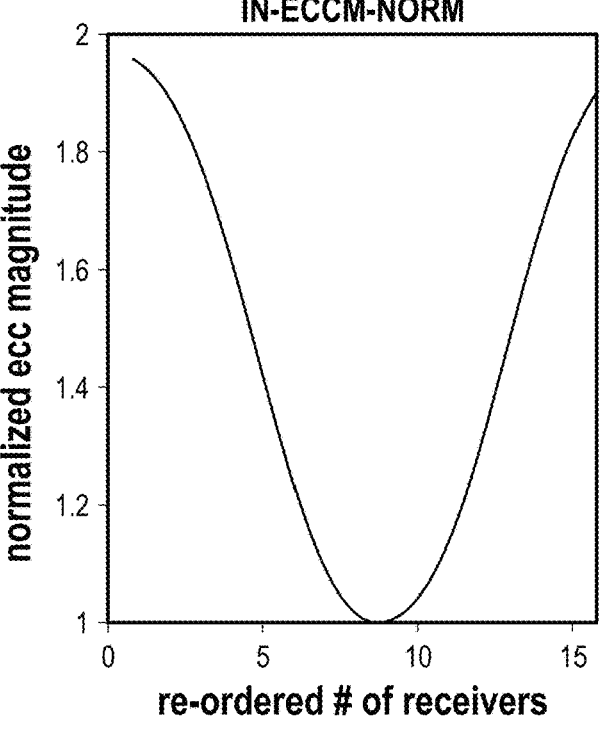
FIG. 16 is a graph of a rearranged normalized eccentricity magnitude pattern from FIG. 15.
Figures 17A, 17B, 17C, 17D, 17E, 17F:
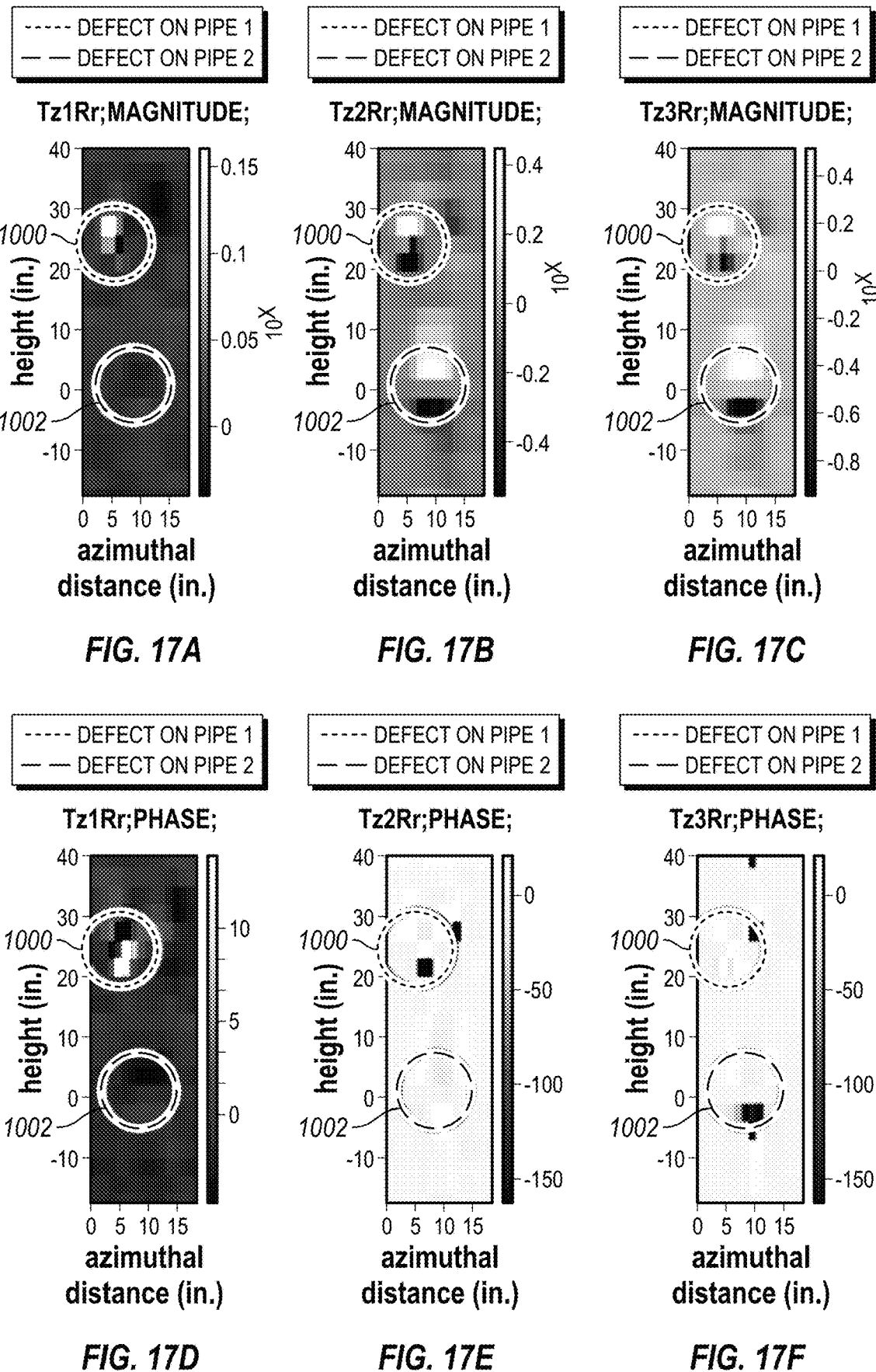
FIGS. 17A-17F illustrate the equalized image after correcting the eccentricity effect.
Figures 18A, 18B, 18C, 18D, 18E, 18F:
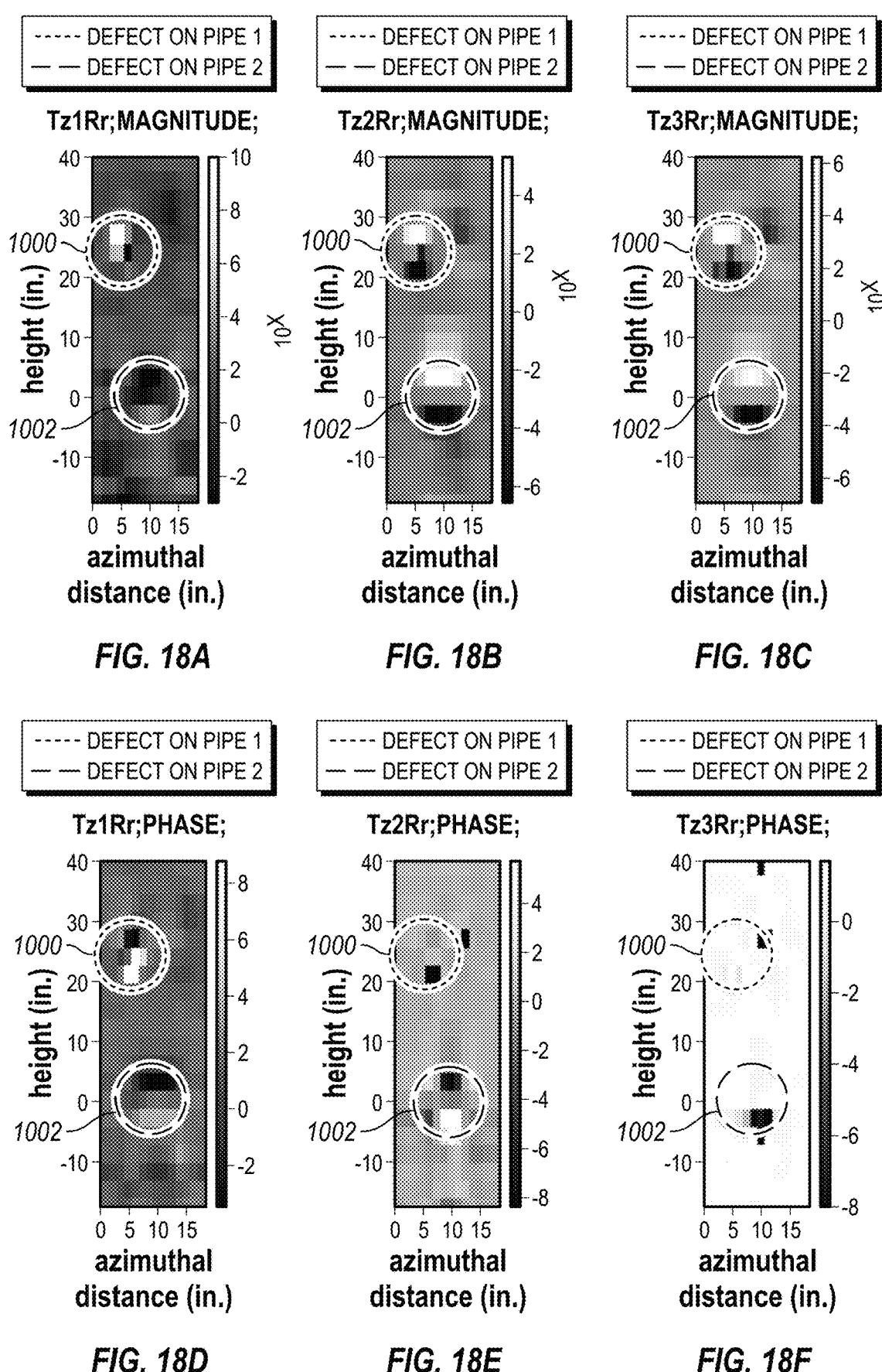
FIGS. 18A-18F illustrate examples of data after applying both eccentricity correction and dynamic scaling.

Referring back to FIG. 14, in block 1406 the order of the multiple receivers 104 is rearrange, which moves the maximum magnitude to the reference angle α used in calculating the database. FIG. 16 shows a rearranged normalized eccentricity magnitude pattern when α=0. Thus, what has been performed is a cyclically shift (or rotation) of the normalized eccentricity pattern until the peak of the pattern aligns at the reference angle used in database calculation. In block 1408, the rearranged normalized eccentricity pattern from block 1406 is compared with the database formed in block 1402. Additionally, in block 1408 a L2 norm of the difference is calculated and an eccentricity ratio that corresponds to the lowest L2 norm of the difference may be found. To calculate the L2 norm of a vector, take the square root of the sum of the squared vector values. This may find the minimum difference of rearranged eccentricity pattern with the database, so the eccentricity ratio can be found.

Referring back to FIG. 9 and workflow 900, in block 908, the data from blocks 904 and/or 906 may undergo further processing to equalize raw data, from block 902, to correct for the eccentricity effect to form an equalized log. The existence of eccentricity may cause deterioration in logging images (i.e., referring to FIGS. 10A-10F). To correct this eccentricity effect, the eccentricity pattern found in block 904 and/or eccentricity ratio and angle from block 906 may be utilized. Within a certain depth window, from block 904, there is an eccentricity magnitude pattern and an eccentricity phase pattern for each transmitter. Multiplication or division may apply to the eccentricity magnitude pattern and the logging images (i.e., referring to FIGS. 10A-10F). Addition or subtraction may apply to the eccentricity phase pattern and the affected logging images. These mathematical operations may be applied when the raw data may be equalized to correct eccentricity effect. The logging data includes both magnitude and phase information. The data may be expressed in the form of $$A * \exp(j\varphi) \tag{8}$$

where A is the magnitude and φ is the phase. Therefore, to correct the eccentricity effect, multiplication or division may be applied to eccentricity magnitude pattern and magnitude of the logging data, and apply addition or subtraction to the eccentricity phase pattern and phase of the logging data. After equalization, the quality of the logging images may be improved. FIGS. 17A-17F show the equalized image after correcting the eccentricity effect. As illustrated, compared to raw image shown in FIGS. 10A-10F, the shades introduced by eccentricity have been removed, and the characteristics of corrosion are shown clearly. For example, first defect 1000 and second defect 1002.

In block 910, dynamic scaling may optionally be applied to each image that has been equalized to form a dynamically scaled image. In block 908. Defects 1000 and 1002 (e.g., referring to FIG. 10) located at different casings may have different levels of signal responses. To show defects 1000 and 1002 at different casings in a single image clearly, dynamic scaling (or dynamic contrast enhancement) may be applied. To apply a dynamic scaling, within a certain depth window (e.g., block 910), all the data within the window is subtracted with a mean of data in the window. Additionally, all the data within the window is divided by the standard deviation of the data. Further, the data at the center depth of the depth window is selected to be displayed. FIGS. 18A-18F illustrate examples of data after applying both eccentricity correction and dynamic scaling. As illustrated be seen, second defect 1002 on the second pipe at 0 inch is shown more clearly after applying dynamic scaling, where first defect 1000 may be unaltered.

In block 912, resolution enhancement techniques may optionally be applied to the images from block 908 or 910. To enhance the resolution of the images, one-dimensional or two-dimensional deconvolution may be applied. After this processing, the edge of the defect may be sharper. Further in block 914, the reference of the outer casing defect based on the estimated eccentricity ratio and angle may be corrected to form one or more corrected reference images. In examples, block 914 may be applied to the images from blocks 908, 910, or 912. As shown in FIG. 13, all the logging images may be produced based on tool reference 1300. If eccentricity exists, tool reference 1300 may be transformed back to borehole reference 1302. The whole image may be re-mapped. In examples, if there is a defect at point A. In tool reference 1300, the azimuthal angle of point A is θ, while in borehole reference 1302, the actual azimuthal angle of point A is φ. The eccentric angle α and eccentric ratio have already been estimated in block 906. Distance ρ is inner radius of outer casing 136. Using these variables, the following formula to correct the reference and remap angle θ to φ.

$$\phi = \begin{cases} \left[\alpha + \arccos\left(\dfrac{\delta^2 + \rho^2 - r_\theta^2}{2\rho\delta}\right)\right] \bmod 2\pi, \\ \quad \text{when}(\theta - \alpha) > \pi, \text{ or } -\pi < (\theta - \alpha) < 0 \\ \left[2\pi + \alpha - \arccos\left(\dfrac{\delta^2 + \rho^2 - r_\theta^2}{2\rho\delta}\right)\right] \bmod 2\pi, \\ \quad \text{when}(\theta - \alpha) \le -\pi, \text{ or } 0 \le (\theta - \alpha) \le \pi \end{cases} \tag{9}$$

where $$r_\theta = -\delta\cos(\theta - \alpha) + \sqrt{\rho^2 - \delta^2\sin^2(\theta - \alpha)} \tag{10}$$

Using Equations (9) and (10) the reference of the outer casing defect based on the estimated eccentricity ratio and angle may be corrected. Equation (9) defines upper and lower bounds for φ and Equation (10) provides the expression of $r_\theta$. The eccentricity ratio and angle are already known from block 906, and they are used as input to calculate the phi. Equation (10) is provided to make Equation (9) less complicated. Equation (9) calculates the exact phi. The value of (theta-alpha) decides which sub-equation in (9) is to use. The calculated phi provides the angle referred to the borehole center.

In block 916 the reference to a true coordinates system may be formed and may be optionally applied to blocks 908, 910, 912, or 914. In block 916, a navigation information/package may be available and utilized in block 902 during measurement operations. This navigation information during measurement operations may be stored in the database. The relative borehole coordinates may be transformed to true coordinates system (i.e., relative to true North). For example, the borehole inclination, borehole inclination azimuth, and tool relative bearing (tool orientation azimuth with respect to the high-side of the borehole) as measured by the navigation package may be used to convert borehole azimuth measured with respect to the pipe coordinate system to true azimuth measured with respect to true North.

In block 918, image data acquired in measurement operations in block 902 and may be optionally processed to blocks 904, 906, 908, 910, 912, 914, 916 in blocks may be inspected to identify defects in tubulars, such as first casing 135 and/or second casing 136. Both human and machine processes may be utilized to perform inspection. It is a direct way for humans to do inspection. If a machine process is to do the inspection, some image recognition machine learning algorithm may be used. Workflow 900 may be utilized to improve images captured by EM logging tool 100 during measurement operations.

Information from Workflow 900 may be utilized to perform remediation operations. For example, defects 1000 and 1002 (e.g., referring to FIG. 10) may be pinpointed in a remediation operation. As such, remediation operations such as reworking, redrilling, cleaning, testing, and the repair and replacement of casing of defects 1000 and 1002.

Improvements from the methods and systems described above comprise providing both azimuthal and axial information of corrosion with high resolution, correcting image data for artifacts such as eccentricity, estimating eccentricity ratio and angle, estimating deformation ratio and angle, determining the azimuth of anomalies with respect to pipe coordinate system, and determining true North. Methods, and system disclosed herein, including one or more of the following statements.

Statement 1: A method comprising: disposing an electromagnetic (EM) logging tool in a wellbore, wherein the EM logging tool comprises: one or more transmitters disposed on the EM logging tool; and one or more receivers disposed on the EM logging tool; transmitting an electromagnetic field from the transmitter into one or more tubulars to energize the one or more tubulars with the electromagnetic field thereby producing an eddy current that emanates from the one or more tubulars; measuring the eddy current in the one or more tubulars with the receiver on at least one channel to obtain a plurality of measurements; forming an EM log from the plurality of measurements; extracting an eccentricity pattern from the EM log; and inspecting at least the eccentricity pattern and EM log to identify defects in tubulars.

Statement 2: The method of statement 1, further comprising estimating an eccentricity ratio and an eccentricity angle from the eccentricity pattern.

Statement 3: The method of statement 2, further comprising equalizing the EM log with at least the eccentricity ratio and the eccentricity angle to form an equalized log.

Statement 4: The method of any of statement 3, wherein multiplication or division may apply to an eccentricity magnitude pattern of the eccentricity pattern.

Statement 5: The method of any of statements 3 or 4, wherein addition or subtraction may apply to an eccentricity phase pattern of the eccentricity pattern and one or more logging images formed from the EM log.

Statement 6: The method of any of statements 3-5, further comprising applying dynamic scaling to the equalized log within a depth window to form a dynamically scaled image.

Statement 7: The method of statement 6, wherein the depth window is sized based at least in part on defects on the one or more tubulars.

Statement 8: The method of statements 6 or 7, wherein dynamic scaling within the depth window comprises subtracting all data within the depth window by a mean of the depth window and dividing all of the data within the window by a standard deviation of the depth window.

Statement 9: The method of any of statements 6-8, applying resolution enhancement techniques to the dynamically scaled image or the equalized log.

Statement 10: The method of any of statement 9, further comprising correcting a reference of an outer casing defect based on the eccentricity ratio and the eccentricity angle to form one or more corrected reference images.

Statement 11: The method of statement 10, further comprising forming a reference of the equalized log, the dynamically scaled image, or the one or more corrected reference images.

Statement 12: A system comprising: an EM logging tool comprising: one or more transmitters disposed on the EM logging tool configured to transmit an electromagnetic field from the transmitter into one or more tubulars to energize the one or more tubulars with the electromagnetic field thereby producing an eddy current that emanates from the one or more tubulars; and one or more receivers disposed on the EM logging tool configured to measure the eddy current in the one or more tubulars with the receiver on at least one channel to obtain a plurality of measurements; an information handling system configured to: measure the eddy current in the one or more tubulars with the receiver on at least one channel to obtain a plurality of measurements; form an EM log from the plurality of measurements; extract an eccentricity pattern from the EM log; and inspect at least the eccentricity pattern and EM log to identify defects in tubulars.

Statement 13: The system of statement 12, wherein the information handling system is configured to estimate an eccentricity ratio and an eccentricity angle form the eccentricity pattern.

Statement 14: The system of statement 13, wherein the information handling system is configured to equalize the EM log with at least the eccentricity ratio and the eccentricity angle to form an equalized log.

Statement 15: The system of statement 14, wherein the information handling system is configured to apply dynamic scaling to the equalized log within a depth window to form a dynamically scaled image.

Statement 16: The system of statement 15, wherein the depth window is sized based at least in part on defects on the one or more tubulars.

Statement 17: The system of statement 16, wherein dynamic scaling within the depth window comprises subtracting all data within the depth window by a mean of the depth window and dividing all of the data within the window by a standard deviation of the depth window.

Statement 18: The system of any of statements 15-17, wherein the information handling system is configured to apply resolution enhancement techniques to the dynamically scaled image or the equalized log.

Statement 19: The system of any of statement 18, wherein the information handling system is configured to correct a reference of an outer casing defect based on the estimated eccentricity ratio and eccentricity angle to form one or more corrected reference images.

Statement 20: The system of statement 19, wherein the information handling system is configured to form a reference of the equalized log, the dynamically scaled image, or the one or more corrected reference images.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
disposing an electromagnetic (EM) logging tool in a wellbore, wherein the EM logging tool comprises:
one or more transmitters disposed on the EM logging tool; and
one or more receivers disposed on the EM logging tool;
transmitting an electromagnetic field from the transmitter into one or more tubulars to energize the one or more tubulars with the electromagnetic field thereby producing an eddy current that emanates from the one or more tubulars;
measuring the eddy current in the one or more tubulars with the receiver on at least one channel to obtain a plurality of measurements;
forming an EM log from the plurality of measurements;
extracting an eccentricity pattern from the EM log; and
inspecting at least the eccentricity pattern and EM log to identify defects in tubulars, wherein inspecting at least the eccentricity pattern further comprises estimating an eccentricity ratio at least on rearranging an order of sensors.

2. The method of claim 1, further comprising estimating an eccentricity ratio and an eccentricity angle from the eccentricity pattern.

3. The method of claim 2, further comprising equalizing the EM log with at least the eccentricity ratio and the eccentricity angle to form an equalized log.

4. The method of claim 3, wherein multiplication or division may apply to an eccentricity magnitude pattern of the eccentricity pattern.

5. The method of claim 3, wherein addition or subtraction may apply to an eccentricity phase pattern of the eccentricity pattern and one or more logging images formed from the EM log.

6. The method of claim 3, further comprising applying dynamic scaling to the equalized log within a depth window to form a dynamically scaled image.

7. The method of claim 6, wherein the depth window is sized based at least in part on defects on the one or more tubulars.

8. The method of claim 6, wherein dynamic scaling within the depth window comprises subtracting all data within the depth window by a mean of the depth window and dividing all of the data within the window by a standard deviation of the depth window.

9. The method of claim 6, further comprising applying resolution enhancement techniques to the dynamically scaled image or the equalized log.

10. The method of claim 9, further comprising correcting a reference of an outer casing defect based on the eccentricity ratio and the eccentricity angle to form one or more corrected reference images.

11. The method of claim 10, further comprising forming a reference of the equalized log, the dynamically scaled image, or the one or more corrected reference images.

12. A system comprising:
an EM logging tool comprising:
one or more transmitters disposed on the EM logging tool configured to transmit an electromagnetic field from the transmitter into one or more tubulars to energize the one or more tubulars with the electromagnetic field thereby producing an eddy current that emanates from the one or more tubulars; and
one or more receivers disposed on the EM logging tool configured to measure the eddy current in the one or more tubulars with the receiver on at least one channel to obtain a plurality of measurements;
an information handling system configured to:
measure the eddy current in the one or more tubulars with the receiver on at least one channel to obtain a plurality of measurements;
form an EM log from the plurality of measurements;
extract an eccentricity pattern from the EM log; and
inspect at least the eccentricity pattern and EM log to identify defects in tubulars, wherein inspecting at least the eccentricity pattern further comprises estimating an eccentricity ratio at least on rearranging an order of sensors.

13. The system of claim 12, wherein the information handling system is configured to estimate an eccentricity ratio and an eccentricity angle form the eccentricity pattern.

14. The system of claim 13, wherein the information handling system is configured to equalize the EM log with at least the eccentricity ratio and the eccentricity angle to form an equalized log.

15. The system of claim 14, wherein the information handling system is configured to apply dynamic scaling to the equalized log within a depth window to form a dynamically scaled image.

16. The system of claim 15, wherein the depth window is sized based at least in part on defects on the one or more tubulars.

17. The system of claim 16, wherein dynamic scaling within the depth window comprises subtracting all data within the depth window by a mean of the depth window and dividing all of the data within the window by a standard deviation of the depth window.

18. The system of claim 15, wherein the information handling system is configured to apply resolution enhancement techniques to the dynamically scaled image or the equalized log.

19. The system of claim 18, wherein the information handling system is configured to correct a reference of an outer casing defect based on the estimated eccentricity ratio and eccentricity angle to form one or more corrected reference images.

20. The system of claim 19, wherein the information handling system is configured to form a reference of the equalized log, the dynamically scaled image, or the one or more corrected reference images.

* * * * *